US012568462B2

(12) United States Patent
Hong

(10) Patent No.: US 12,568,462 B2
(45) Date of Patent: Mar. 3, 2026

(54) USER EQUIPMENT POSITIONING METHOD AND DEVICE BASED ON INTEGRATED ACCESS AND BACKHAUL

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 451 days.

(21) Appl. No.: 18/265,641

(22) PCT Filed: Dec. 7, 2020

(86) PCT No.: PCT/CN2020/134344
§ 371 (c)(1),
(2) Date: Jun. 6, 2023

(87) PCT Pub. No.: WO2022/120536
PCT Pub. Date: Jun. 16, 2022

(65) Prior Publication Data
US 2023/0370996 A1 Nov. 16, 2023

(51) Int. Cl.
*H04W 64/00* (2009.01)
*H04L 5/00* (2006.01)
*H04W 28/02* (2009.01)

(52) U.S. Cl.
CPC ......... *H04W 64/003* (2013.01); *H04L 5/0048* (2013.01); *H04W 28/0226* (2013.01)

(58) Field of Classification Search
CPC ... H04W 64/00; H04W 4/029; H04W 64/003; H04W 28/0226; H04L 5/0048
See application file for complete search history.

(56) References Cited

U.S. PATENT DOCUMENTS

| | | | | |
|---|---|---|---|---|
| 10,021,626 | B2 * | 7/2018 | Bell | H04W 4/022 |
| 2007/0191022 | A1 * | 8/2007 | Yanagihara | H04W 64/00 455/456.1 |
| 2013/0122914 | A1 * | 5/2013 | Fukuta | H04W 8/22 455/456.2 |
| 2016/0036762 | A1 * | 2/2016 | Droms | H04L 61/4511 709/224 |
| 2016/0142897 | A1 * | 5/2016 | Sorrentino | H04W 16/14 370/329 |
| 2021/0120517 | A1 * | 4/2021 | Akkarakaran | G01S 5/02213 |
| 2021/0168743 | A1 * | 6/2021 | Sheng | H04L 1/1614 |
| 2021/0251043 | A1 * | 8/2021 | Abedini | H04W 88/14 |
| 2022/0007275 | A1 * | 1/2022 | Li | H04W 72/21 |

(Continued)

FOREIGN PATENT DOCUMENTS

| | | | | |
|---|---|---|---|---|
| CN | 107113591 A | 8/2017 | | |
| WO | WO-2015129588 A1 * | 9/2015 | | H04N 21/47 |
| WO | WO-2018227697 A1 * | 12/2018 | | H04W 4/021 |

OTHER PUBLICATIONS

3GPP TS 38.305 V16.2.0 (Nov. 2020) (Year: 2020).*

(Continued)

*Primary Examiner* — Dung Hong
(74) *Attorney, Agent, or Firm* — Cozen O'Connor

(57) ABSTRACT

A user equipment (UE) positioning method based on integrated access and backhaul (IAB). In the solution, location information of a UE to be located is determined according to information of an IAB node that establishes a connection with the UE.

16 Claims, 8 Drawing Sheets obtaining report information about the UE from a base station in response to a location service request for the UE, the report information including identification of an IAB node corresponding to the UE — S201 determining location information of the UE based on the report information — S202

(56) References Cited

U.S. PATENT DOCUMENTS

| | | | |
|---|---|---|---|
| 2022/0110187 A1* | 4/2022 | Qaisrani ............... | H04W 40/22 |
| 2022/0167303 A1* | 5/2022 | Lee ..................... | H04W 64/006 |

OTHER PUBLICATIONS

European Patent Application No. 20964483.0, Search and Opinion Dec. 20, 2023, 14 pages.
3rd Generation Partnership PROJECT;Technical Specification Group Radio Access Network; NG Radio Access Network (NG-RAN); Stage 2 functional specification of User Equipment (UE)positioning in NG-RAN (Release 16), Sep. 2020, 117 pages.
PCT/CN2020/134344, English translation of International Search Report dated Sep. 8, 2021, 2 pages.

* cited by examiner

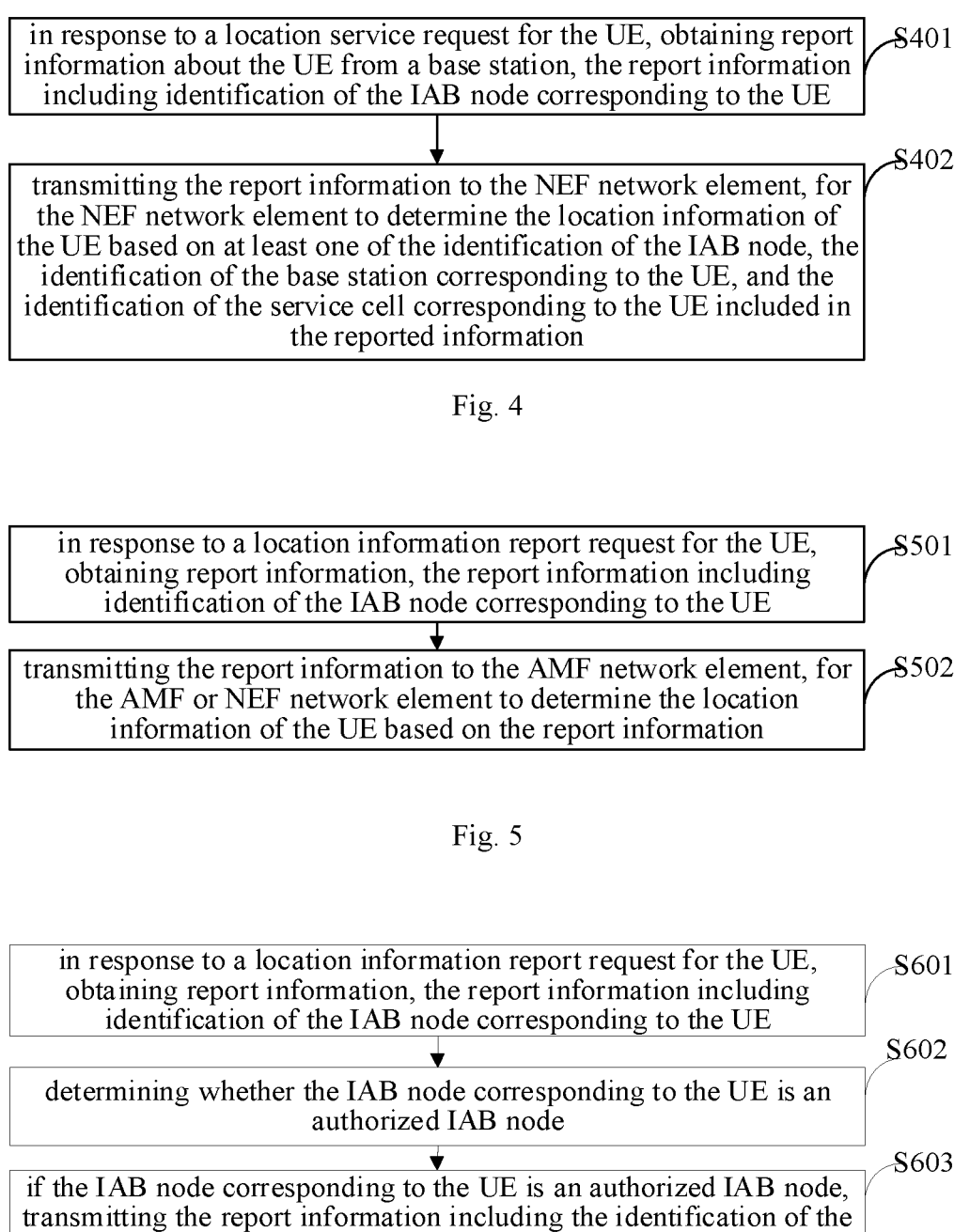

in response to a location service request for the UE, obtaining report information about the UE from a base station, the report information including identification of the IAB node corresponding to the UE   S401 transmitting the report information to the NEF network element, for the NEF network element to determine the location information of the UE based on at least one of the identification of the IAB node, the identification of the base station corresponding to the UE, and the identification of the service cell corresponding to the UE included in the reported information   S402

Fig. 4 in response to a location information report request for the UE, obtaining report information, the report information including identification of the IAB node corresponding to the UE   S501 transmitting the report information to the AMF network element, for the AMF or NEF network element to determine the location information of the UE based on the report information   S502

Fig. 5 in response to a location information report request for the UE, obtaining report information, the report information including identification of the IAB node corresponding to the UE   S601 determining whether the IAB node corresponding to the UE is an authorized IAB node   S602 if the IAB node corresponding to the UE is an authorized IAB node, transmitting the report information including the identification of the IAB node to the AMF network element   S603

Fig. 6

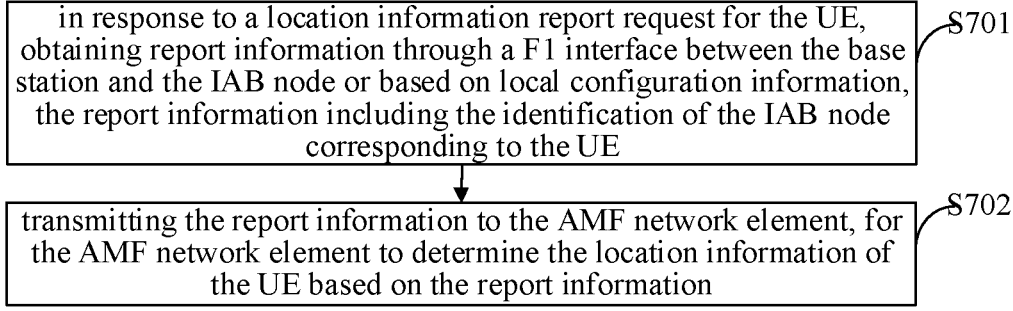

in response to a location information report request for the UE, obtaining report information through a F1 interface between the base station and the IAB node or based on local configuration information, the report information including the identification of the IAB node corresponding to the UE — S701 transmitting the report information to the AMF network element, for the AMF network element to determine the location information of the UE based on the report information — S702

Fig. 7

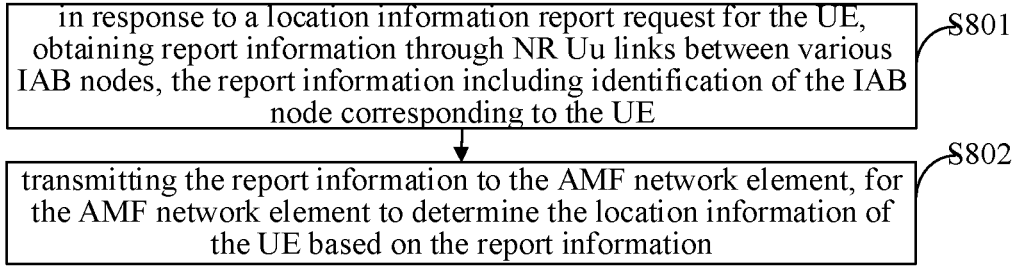

in response to a location information report request for the UE, obtaining report information through NR Uu links between various IAB nodes, the report information including identification of the IAB node corresponding to the UE — S801 transmitting the report information to the AMF network element, for the AMF network element to determine the location information of the UE based on the report information — S802

Fig. 8

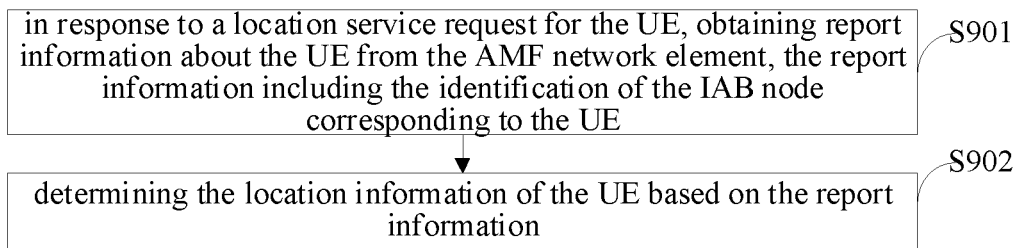

in response to a location service request for the UE, obtaining report information about the UE from the AMF network element, the report information including the identification of the IAB node corresponding to the UE — S901 determining the location information of the UE based on the report information — S902

Fig. 9

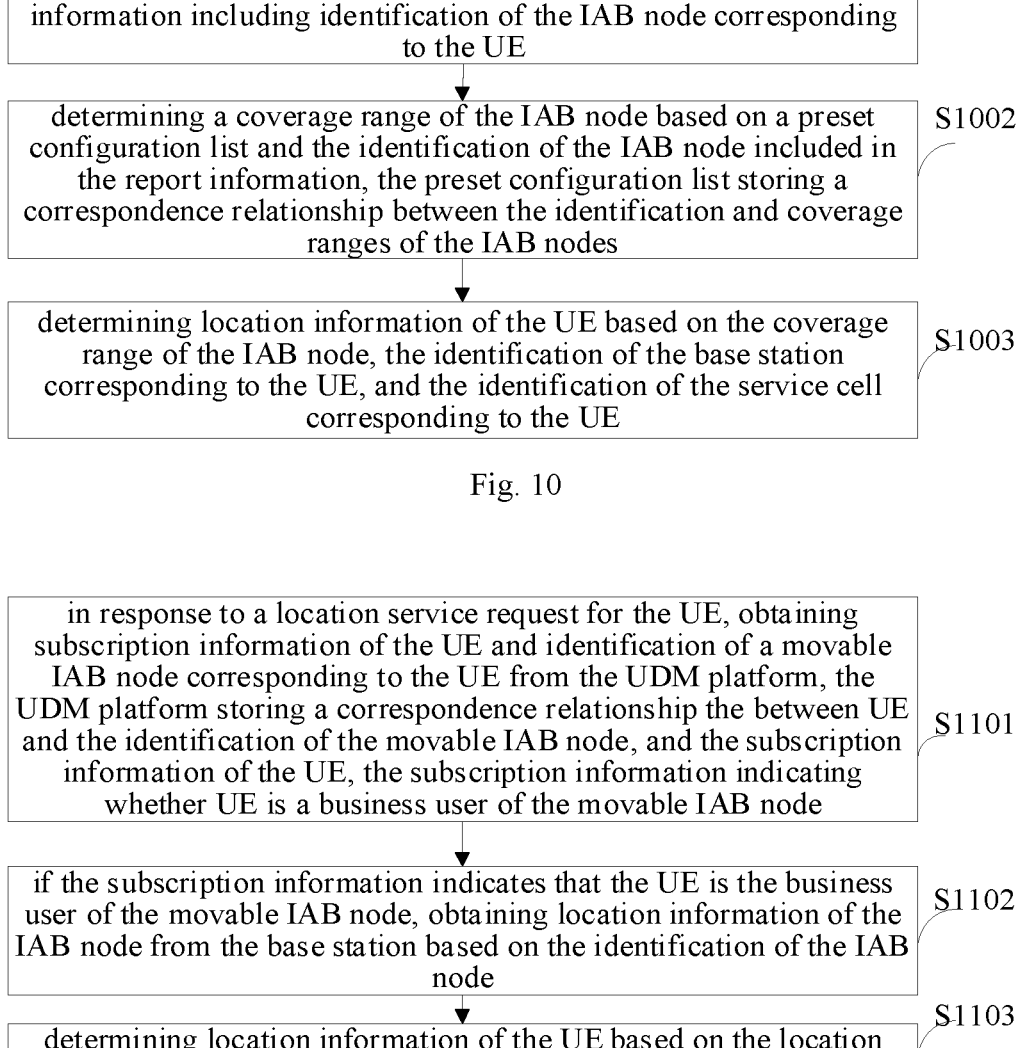

in response to a location service request for the UE, obtaining report information about the UE from an AMF network element, the report information including identification of the IAB node corresponding to the UE      S1001 determining a coverage range of the IAB node based on a preset configuration list and the identification of the IAB node included in the report information, the preset configuration list storing a correspondence relationship between the identification and coverage ranges of the IAB nodes      S1002 determining location information of the UE based on the coverage range of the IAB node, the identification of the base station corresponding to the UE, and the identification of the service cell corresponding to the UE      S1003

Fig. 10 in response to a location service request for the UE, obtaining subscription information of the UE and identification of a movable IAB node corresponding to the UE from the UDM platform, the UDM platform storing a correspondence relationship the between UE and the identification of the movable IAB node, and the subscription information of the UE, the subscription information indicating whether UE is a business user of the movable IAB node      S1101 if the subscription information indicates that the UE is the business user of the movable IAB node, obtaining location information of the IAB node from the base station based on the identification of the IAB node      S1102 determining location information of the UE based on the location information of the IAB node      S1103

Fig. 11

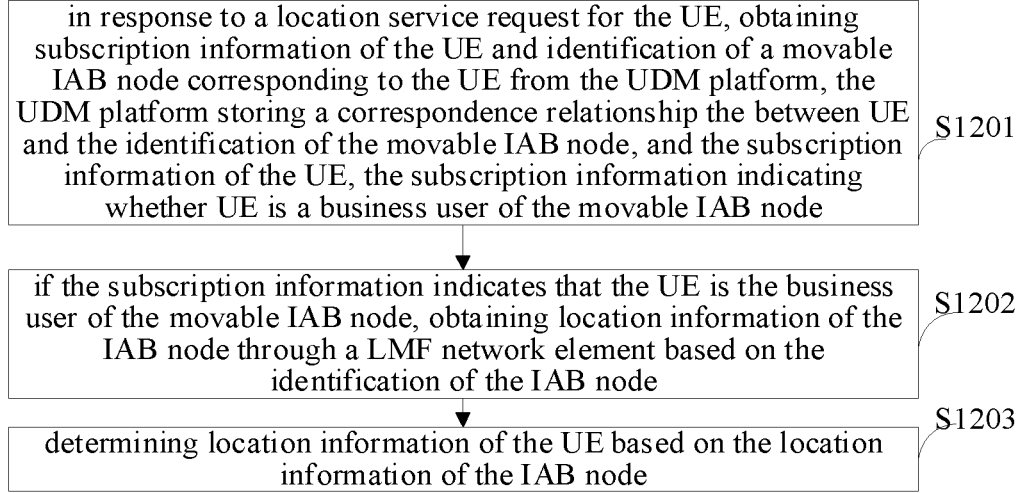

in response to a location service request for the UE, obtaining subscription information of the UE and identification of a movable IAB node corresponding to the UE from the UDM platform, the UDM platform storing a correspondence relationship the between UE and the identification of the movable IAB node, and the subscription information of the UE, the subscription information indicating whether UE is a business user of the movable IAB node   S1201 if the subscription information indicates that the UE is the business user of the movable IAB node, obtaining location information of the IAB node through a LMF network element based on the identification of the IAB node   S1202 determining location information of the UE based on the location information of the IAB node   S1203

Fig. 12

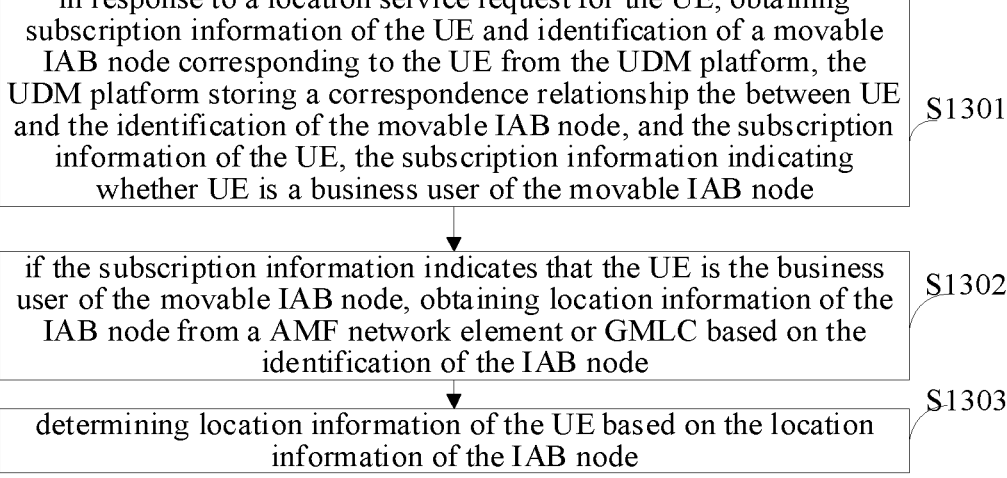

in response to a location service request for the UE, obtaining subscription information of the UE and identification of a movable IAB node corresponding to the UE from the UDM platform, the UDM platform storing a correspondence relationship the between UE and the identification of the movable IAB node, and the subscription information of the UE, the subscription information indicating whether UE is a business user of the movable IAB node   S1301 if the subscription information indicates that the UE is the business user of the movable IAB node, obtaining location information of the IAB node from a AMF network element or GMLC based on the identification of the IAB node   S1302 determining location information of the UE based on the location information of the IAB node   S1303

Fig. 13

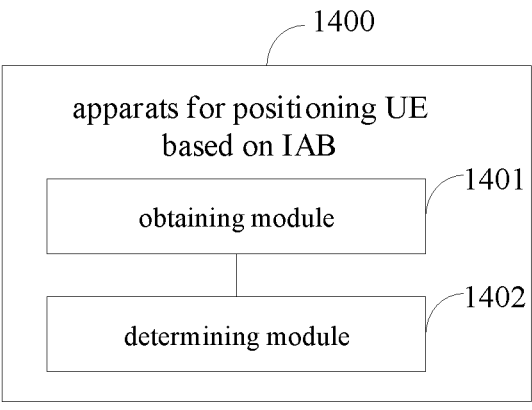

1400 apparats for positioning UE based on IAB obtaining module   1401 determining module   1402

USER EQUIPMENT POSITIONING METHOD AND DEVICE BASED ON INTEGRATED ACCESS AND BACKHAUL

CROSS-REFERENCE TO RELATED APPLICATION

This application is the US national phase application of International Application No. PCT/CN2020/134344, filed on Dec. 7, 2020, the entire contents of which are incorporated herein by reference for all purposes.

TECHNICAL FIELD

The disclosure relates to the field of mobile communication technologies, and in particular, to a method and an apparatus for positioning a user equipment based on integrated access and backhaul.

BACKGROUND

Integrated access and backhaul (IAB) sites have been introduced in the network, which integrate wireless access links as communication links between user equipment (UE) and IAB sites, as well as wireless backhaul links as communication links between the IAB sites. The IAB sites do not require wired transmission networks for data backhaul, which make them more suitable for deployment in dense scenarios.

However, when the UE is connected to the network system through the IAB site, if the existing location reporting process is used for UE positioning, there is a possibility that the reported position deviates from the UE's current position.

SUMMARY

Embodiments of a first aspect of the present disclosure provide a method for positioning a UE based on IAB. The method is applied to an access and mobility management function (AMF) network element, wherein IAB nodes are deployed in fixed locations. The method includes: obtaining report information about the UE from a base station in response to a location service request for the UE, wherein the report information includes identification of an IAB node corresponding to the UE; and determining location information of the UE based on the report information.

Embodiments of a second aspect of the present disclosure provide a method for positioning a user equipment (UE) based on integrated access and backhaul (IAB). The method applied to a base station, wherein IAB nodes are deployed in fixed locations. The method includes: obtaining report information in response to a location information report request for the UE, wherein the report information includes identification of an IAB node corresponding to the UE; and transmitting the report information to an access and mobility management function (AMF) network element, for the AMF network element or a NEF network element to determine location information of the UE according to the report information.

Embodiments of a third aspect of the present disclosure provide a method for positioning a user equipment (UE) based on integrated access and backhaul (IAB). The method is applied to a network exposure function (NEF) network element, wherein IAB nodes are deployed in fixed locations. The method includes: obtaining report information about the UE from an access and mobility management function

2

(AMF) network element in response to a location service request for the UE, wherein the report information includes identification of an IAB node corresponding to the UE; and determining location information of the UE based on the report information.

Embodiments of a fourth aspect of the present disclosure provide a method for positioning a user equipment (UE) based on integrated access and backhaul (IAB). The method is applied to an access and mobility management function (AMF) network element, wherein IAB nodes are deployed on movable objects. The method includes: obtaining subscription information of the UE and identification of a movable IAB node corresponding to the UE from a unified data management (UDM) platform in response to a location service request for the UE, wherein the UDM platform stores a correspondence relationship between the UE and the identification of the movable IAB node, and the subscription information of the UE, wherein the subscription information indicates whether the UE is a business user of a movable IAB node; if the subscription information of the UE indicates that the UE is a business user of a movable IAB node, obtaining location information of the movable IAB node from a base station based on the identification of the movable IAB node; and determining location information of the UE based on the location information of the movable IAB node.

Embodiments of a fifth aspect of the present disclosure provide a method for positioning a user equipment (UE) based on integrated access and backhaul IAB. The method is applied to a gateway mobile location center (GMLC), wherein IAB nodes are deployed on movable objects. The method includes: obtaining subscription information of the UE and identification of a movable IAB node corresponding to the UE from a unified data management (UDM) platform in response to a location service request for the UE, wherein the UDM platform stores a correspondence relationship between the UE and the identification of the movable IAB node, and the subscription information of the UE, wherein the subscription information indicates whether the UE is a business user of a movable IAB node; if the subscription information of the UE indicates that the UE is a business user of a movable IAB node, obtaining location information of the movable IAB node through a location management function (LMF) network element based on the identification of the movable IAB node; and determining location information of the UE based on the location information of the movable IAB node.

Embodiments of a sixth aspect of the present disclosure provide a method for positioning a user equipment (UE) based on integrated access and backhaul (IAB). The method is applied to a network exposure function (NEF) network element, wherein IAB nodes are deployed on movable objects. The method includes: obtaining subscription information of the UE and identification of an IAB node corresponding to the UE from a unified data management (UDM) platform in response to a location service request for the UE, wherein the UDM platform stores a correspondence relationship between the UE and the identification of the movable IAB node, and the subscription information of the UE, wherein the subscription information indicates whether the UE is a business user of the movable IB node; obtaining location information of the movable IAB node from an access and mobility management function (AMF) network element or a gateway mobile location center (GMLC) based on the identification of the movable IAB node, if the subscription information of the UE indicates that the UE is the business user of the movable IAB node; and determining location information of the UE based on the location information of the movable IAB node.

Embodiments of a seventh aspect of the present disclosure provide a communication device, including: a transceiver; a memory; and a processor, connected to the transceiver and the memory respectively, and configured to control wireless signal transmitting and receiving of the transceiver by executing computer executable instructions on the memory, and capable of implementing the method according to embodiments of the first aspect, embodiments of the second aspect, embodiments of the third aspect, embodiments of the fourth aspect, embodiments of the fifth aspect, or embodiments of the sixth aspect.

Embodiments of an eighth aspect of the present disclosure provide a computer storage medium. The computer storage medium stores computer executable instructions, which when executed by the processor, the method according to embodiments of the first aspect, embodiments of the second aspect, embodiments of the third aspect, embodiments of the fourth aspect, embodiments of the fifth aspect, or embodiments of the sixth aspect can be implemented.

The additional aspects and advantages of this disclosure will be partially provided in the following description, and some will become apparent from the following description or learned through the practice of this disclosure.

BRIEF DESCRIPTION OF THE DRAWINGS

The above and/or additional aspects and advantages of this disclosure will become apparent and easy to understand from the description of embodiments in conjunction with the accompanying drawings, wherein

FIG. 4 is a flow chart of a method for positioning a UE based on IAB according to an embodiment of the present disclosure;

FIG. 5 is a flow chart of another method for positioning a UE based on IAB according to an embodiment of the present disclosure;

FIG. 6 is a flow chart of another method for positioning a UE based on IAB according to an embodiment of the present disclosure;

FIG. 7 is a flow chart of a method for positioning a UE based on IAB according to an embodiment of the present disclosure;

FIG. 8 is a flow chart of another method for positioning a UE based on IAB according to an embodiment of the present disclosure;

FIG. 9 is a flow chart of yet another method for positioning a UE based on IAB according to an embodiment of the present disclosure;

FIG. 10 is a flow chart of yet another method for positioning a UE based on IAB according to an embodiment of the present disclosure;

FIG. 11 is a flow chart of still yet another method for positioning a UE based on IAB according to an embodiment of the present disclosure;

FIG. 12 is a flow chart of still yet another method for positioning a UE based on IAB according to an embodiment of the present disclosure;

FIG. 13 is a flow chart of still yet another method for positioning a UE based on IAB according to an embodiment of the present disclosure;

FIG. 14 is a bock diagram of an apparatus for positioning a UE based on IAB according to an embodiment of the present disclosure;

DETAILED DESCRIPTION

The following describes in detail embodiments of the present disclosure, examples of which are shown in the accompanying drawings, where the same or similar labels throughout represent the same or similar components or components with the same or similar functions. The embodiments described below with reference to the accompanying drawings are exemplary and intended to explain the present disclosure, but cannot be understood as limiting the disclosure.

In the current field of mobile communication technology, especially in the 5G new radio (NR) technology, integrated access and backhaul (IAB) sites have been introduced, which integrate wireless access links and wireless backhaul links. The wireless access link is the communication link between UE and IAB site, while the wireless backhaul link is the communication link between IAB sites, providing a data backhaul path. Therefore, IAB sites do not require wired transmission networks for data backhaul. Based on this, it is easier to deploy IAB sites in dense scenarios, reducing the burden of deploying wired transmission networks. In an IAB network, a wireless backhaul node can provide wireless access services for terminal devices. The wireless backhaul node can be called an IAB node or a relay node (RN). The business data of terminal devices can be transmitted by the wireless backhaul node connected to the donor node through a wireless backhaul link. The donor node may be an IAB donor or a donor base station (DGNB, donor gNodeB).

Figure 1:
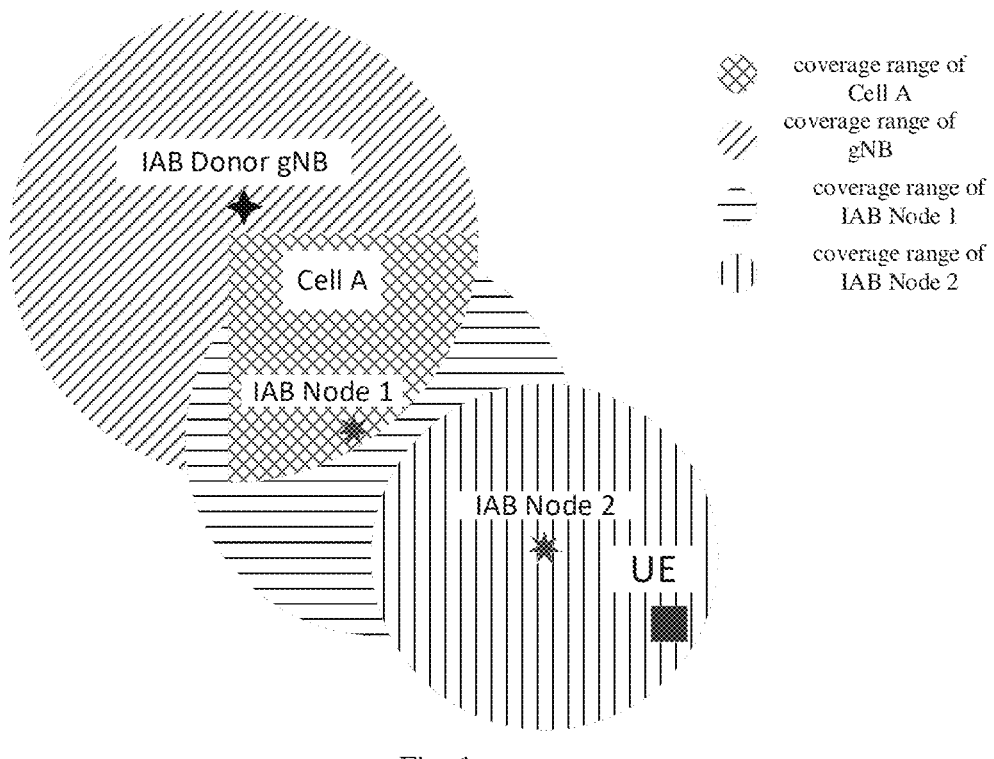
FIG. 1 shows a schematic diagram of a coverage range of IAB nodes and a UE they serve.

FIG. 1 shows a schematic diagram of a coverage range of IAB nodes and a user equipment (UE) they serve. As shown in FIG. 1, one IAB donor and two IAB nodes are shown, where UE is connected to the network through IAB node2, i.e., UE is currently within the coverage range of IAB node2. However, when the existing location reporting process is used to locate the UE, such as when an AMF network element requests to report the location of a connected UE, the reported UE location information is the cell ID, and in the case shown in FIG. 1, the ID of cell A. The location of the UE obtained based on the coverage range of the cell significantly deviates from the current position of the UE, as the UE is not currently within the coverage range of cell A. Therefore, in the IAB network, using the existing location reporting process to locate UE can easily cause the obtained UE location information to deviate significantly from the actual position of the UE.

In other cases, the IAB node may also be deployed on a movable object, and the UE located on the same movable object can access the network through the IAB node. For example, a MBSR (mobile base station relay) is a mobile IAB node. When the UE is connected to the network through the IAB node on the movable object, positioning the UE requires a complex communication process, while the UE consumes more power during the process.

In view of this, this disclosure provides a method and an apparatus for positioning a UE based on IAB, which determines location information of the UE based on the IAB node corresponding to the target UE (the UE to be located).

Specifically, when the IAB node is deployed in a fixed location, the location information of the UE is determined based on report information by obtaining the report information, which includes the identification of the IAB node corresponding to the target UE. This avoids the problem that the reported UE location information, such as the identification information of the cell to which the UE belongs, cannot accurately represent the current location of the UE when the existing location reporting process is used for UE positioning. When the IAB node is deployed on a movable object, the identification of the IAB node corresponding to the target UE is obtained from the UDM platform, and the location information of the IAB node is obtained based on the identification of the IAB node and used as the location information of the target UE. When the IAB node is deployed on a movable object, the UE connected to the network through the IAB node is usually also located on the movable object. Therefore, the location information of the movable IAB node can be considered as the location information of the UE connected to the network through it. Therefore, the location information of the UE can be obtained by obtaining the location information of the IAB node, which avoids the complex communication process required for tracking the UE located on the movable object and avoids the power consumption of the UE in this complex communication process, thus simplifying the UE positioning process and saving the power consumption of the UE.

Figure 2:
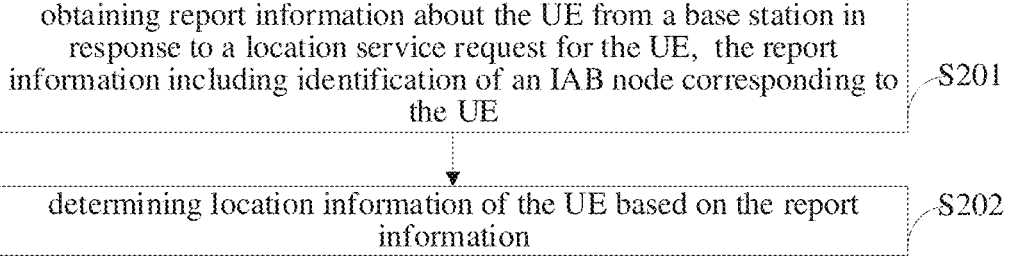
FIG. 2 is a flow chart of a method for positioning a UE based on IAB according to an embodiment of the present disclosure.

FIG. 2 shows a flowchart of a method for positioning a UE based on IAB according to an embodiment of the present disclosure, in which an IAB node is deployed in a fixed location. That is, the IAB node is deployed as a fixed node. When the IAB node is located in a fixed location, the coverage range of the IAB node is a fixed area, and therefore its identification can be mapped to a fixed area of the core network. When the UE to be located, i.e. the target UE, is a UE that is connected to the network through the IAB node in the fixed location, the following method can be used to achieve UE positioning. In this embodiment, the method is executed by an AMF network element, as shown in FIG. 2, the method for positioning the UE based on IAB includes the following steps.

At S201, in response to a location service request for the UE, report information about the UE is obtained from a base station, the report information including identification of the IAB node corresponding to the UE.

When the AMF network element receives a location service request for the target UE, such as through the NEF network element from the Application Function (AF), the AMF network element can obtain the report information about the target UE from the base station, which includes the identification of the IAB node corresponding to the target UE. The 'IAB node corresponding to UE' can refer to the IAB node that establishes a connection with the UE, for example, the UE accesses the network through this IAB node.

In some embodiments, in response to the location service request for the target UE, the AMF network element can trigger a location reporting process. During this location reporting process, the base station can report the identification of the IAB node establishing a connection with the target UE to the AMF network element. Specifically, for example, after receiving the location service request for the target UE, the AMF network element can send a location report request to the base station to request that the base station reports the location information of the target UE. In response to the location report request, the base station transmits the report information, including the identification of the IAB node connected to the target UE, to the AMF network element.

In some embodiments, in addition to the identification of the IAB node establishing a connection with the target UE, the identification of the base station corresponding to the target UE and/or the identification of the cell corresponding to the target UE can also be reported to the AMF network element.

At S202, location information of the UE is determined based on the report information.

After obtaining the report information, the AMF network element can determine the location information of the target UE based on the report information. Since the report information received by the AMF network element includes the identification of the IAB node establishing a connection with the target UE, and as mentioned earlier, the IAB node is deployed in a fixed location, and the identification of the IAB node can be mapped to a fixed area of the core network, the location information of the target UE thus can be determined based on the identification of the IAB node.

In the disclosed embodiment, by obtaining report information including the identification of the IAB node corresponding to the target UE (UE to be located), the location information of the UE is determined based on the report information, thereby avoiding the problem that the reported UE location information, such as the identification information of the cell to which the UE belongs, cannot accurately represent the current location of the UE, when the existing location reporting process is used for UE positioning.

Figure 3:
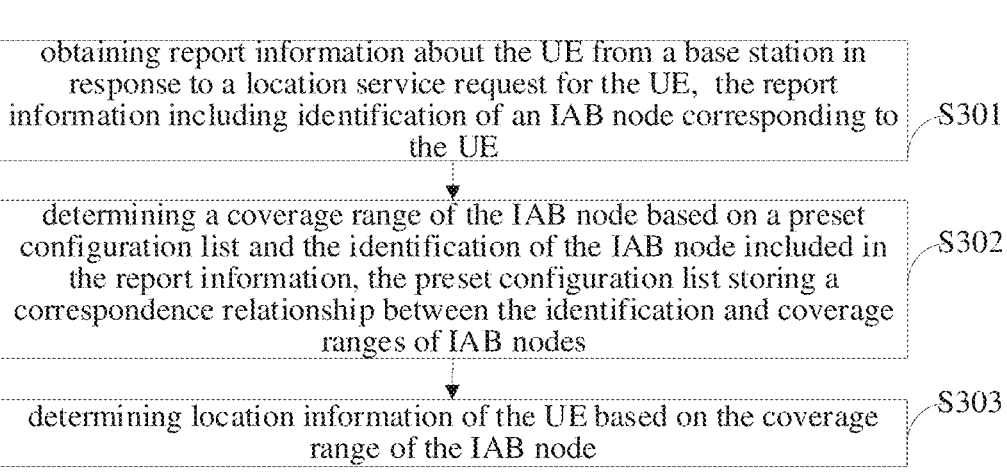
FIG. 3 is a flow chart of a method for positioning a UE based on IAB according to an embodiment of the present disclosure.

FIG. 3 is a flowchart of a method for positioning a UE based on IAB according to an embodiment of the present disclosure, in which an IAB node is deployed in a fixed location, and the coverage range of the IAB node is a fixed area, and thus its identification can be mapped to a fixed area of the core network. When the UE to be located, i.e. the target UE, is a UE that is connected to the network through the IAB node in the fixed location, the following method can be used to achieve UE positioning. In this embodiment, the method is executed by the AMF network element, as shown in FIG. 3, the method for positioning the UE based on IAB includes the following steps.

At S301, in response to a location service request for the UE, report information about the UE is obtained from a base station, the report information including identification of the IAB node corresponding to the UE.

When the AMF network element receives the location service request for the target UE, such as through the NEF network element from the Application Function (AF), the AMF network element can obtain the report information about the target UE from the base station, which includes the identification of the IAB node corresponding to the target UE. The 'IAB node corresponding to the UE' can refer to the IAB node that establishes a connection with the UE, for example, the UE accesses the network through this IAB node.

In some embodiments, in response to the location service request for the target UE, the AMF network element can trigger a location reporting process. During this location reporting process, the base station can report the identification of the IAB node establishing a connection with the target UE to the AMF network element. Specifically, for example, after receiving the location service request for the target UE, the AMF network element can send a location report request to the base station to request that the base station reports the location information of the target UE. In response to the location report request, the base station transmits the report information, including the identification of the IAB node connected to the target UE, to the AMF network element.

In some embodiments, in addition to the identification of the IAB node establishing a connection with the target UE, the identification of the base station corresponding to the target UE and/or the identification of the cell corresponding to the target UE can also be reported to the AMF network element.

At S302, a coverage range of the IAB node is determined based on a preset configuration list and the identification of the IAB node included in the report information. The preset configuration list stores a correspondence relationship between the identification and coverage ranges of IAB nodes.

After obtaining the report information, the AMF network element can determine the location information of the target UE based on the report information.

Specifically, since the coverage range of the IAB node located in a fixed location is a fixed area, a configuration list can be specified in advance. For each IAB node located in a fixed location, its coverage range can be specified. For example, in this configuration list, the correspondence relationship between the identification of IAB nodes located in fixed locations and their coverage ranges can be stored.

This configuration list can be configured in the AMF network element, NEF network element, or both.

In this embodiment, the configuration list is configured in the AMF network element or has been obtained by the AMF network element from the NEF network element. After the AMF network element receives the report information including the identification of the IAB node establishing a connection with the target UE, the AMF network element can obtain the coverage range of the IAB node establishing a connection with the target UE based on the configuration list, for example, by querying the configuration list and obtaining the coverage range of the IAB node based on the identification of the IAB node.

At S303, location information of the UE is determined based on the coverage range of the IAB node.

After determining the coverage range of the IAB node that establishes a connection with the target UE, the location information of the UE can be determined based on this coverage range. For example, as shown in FIG. 1, after determining the coverage range of the IAB node 2 that establishes a connection with the UE, the location information of the UE can be determined, and it can be determined that the UE is within the coverage range of IAB node2.

In the disclosed embodiment, by obtaining the report information including the identification of the IAB node corresponding to the target UE (the UE to be located), the coverage range of the IAB node is determined based on the report information, and the location information of the UE is determined based on the coverage range of the IAB node, thereby avoiding the problem that the reported UE location information, such as the identification information of the cell to which the UE belongs, cannot accurately represent the current location of the UE, when the existing location reporting process is used for UE positioning.

FIG. 4 is a flowchart of a method for positioning a UE based on IAB according to an embodiment of the present disclosure, in which the IAB node is deployed in a fixed location, and the coverage range of the IAB node is a fixed area, and thus its identification can be mapped to a fixed area of the core network. When the UE to be located, i.e. the target UE, is a UE that is connected to the network through the IAB node in the fixed location, the following method can be used to achieve UE positioning. In this embodiment, the method is executed by the AMF network element, as shown in FIG. 4, the method for positioning the UE based on IAB includes the following steps.

At S401, in response to a location service request for the UE, report information about the UE is obtained from a base station, the report information including identification of the IAB node corresponding to the UE.

When the AMF network element receives the location service request for the target UE, such as through the NEF network element from the Application Function (AF), the AMF network element can obtain the report information about the target UE from the base station, which includes the identification of the IAB node corresponding to the target UE. The 'IAB node corresponding to the UE' can refer to the IAB node that establishes a connection with the UE, for example, the UE accesses the network through this IAB node.

In some embodiments, in response to the location service request for the target UE, the AMF network element can trigger a location reporting process. During this location reporting process, the base station can report the identification of the IAB node establishing a connection with the target UE to the AMF network element. Specifically, for example, after receiving the location service request for the target UE, the AMF network element can send a location report request to the base station to request that the base station reports the location information of the target UE. In response to the location report request, the base station transmits the report information, including the identification of the IAB node connected to the target UE, to the AMF network element.

In some embodiments, in addition to the identification of the IAB node establishing a connection with the target UE, the identification of the base station corresponding to the target UE and the identification of the cell corresponding to the target UE can also be reported to the AMF network element.

At S402, the report information is transmitted to the NEF network element, for the NEF network element to determine the location information of the UE based on at least one of the identification of the IAB node, the identification of the base station corresponding to the UE, and the identification of the service cell corresponding to the UE included in the reported information.

After the AMF network element receives the report information including the identification of the IAB node establishing a connection with the target UE, the AMF network element can transmit the report information to the NEF network element, allowing the NEF network element to determine the location information of the target UE based on the identification of the IAB node establishing a connection with the target UE, the identification of the base station corresponding to the UE, and the identification of the service cell corresponding to the UE.

Specifically, since the coverage range of the IAB node located in a fixed location is a fixed area, a configuration list can be specified in advance, where for each IAB node located in a fixed location, its coverage range can be specified. For example, in this configuration list, the correspondence relationship between the identification of IAB nodes located in fixed locations and their coverage ranges can be stored.

This configuration list can be configured in the AMF network element, NEF network element, or both.

In this embodiment, the configuration list is configured in the NEF network element or obtained from the AMF network element. After the AMF network element receives the report information including the identification of the IAB node establishing a connection with the target UE, the AMF network element can transmit the report information to the NEF network element. After receiving the report information, the NEF network element can obtain the coverage range of the IAB node establishing a connection with the target UE based on the configuration list, for example, by querying the configuration list and obtaining the coverage range of the IAB node based on the identification of the IAB node. After determining the coverage range of the IAB node that establishes a connection with the target UE, the NEF network element can also determine the specific location information of the UE based on the coverage range, the identification of the base station corresponding to the UE, and the identification of the service cell corresponding to the UE.

In the disclosed embodiment, by obtaining the report information including the identification of the IAB node corresponding to the target UE (the UE to be located), the report information is sent to the NEF network element, so that the NEF network element can determine the location information of the UE based on the report information, thereby avoiding the problem that the reported UE location information, such as the identification information of the cell to which the UE belongs, cannot accurately represent the current location of the UE, when the existing location reporting process is used for UE positioning.

FIG. 5 is a flowchart of another method for positioning a UE based on IAB according to an embodiment of the present disclosure, in which the IAB node is deployed in a fixed location. When the IAB node is located in a fixed location, the coverage range of the IAB node is a fixed area, and therefore its identification can be mapped to the fixed area of the core network. When the UE to be located, i.e. the target UE, is a UE that is connected to the network through the IAB node in the fixed location, the following method can be used to achieve UE positioning. In this embodiment, the method is executed by a base station, as shown in FIG. 5, the method for positioning the UE based on IAB includes the following steps.

At S501, in response to a location information report request for the UE, report information is obtained, the report information including identification of the IAB node corresponding to the UE.

After receiving the location information report request for the target UE, the base station obtains the report information about the target UE, which includes the identification of the IAB node corresponding to the target UE. The 'IAB node corresponding to the UE' can refer to the IAB node that establishes a connection with the UE, for example, the UE accesses the network through this IAB node.

In some embodiments, in response to a location service request for the target UE, such as receiving the location service request from the Application Function (AF) through the NEF network element, the AMF network element can trigger the location reporting process, during which the base station can obtain the identification of the IAB node that has established a connection with the target UE. Specifically, for example, after receiving the location service request for the target UE, the AMF network element can send a location report request to the base station to request the base station to report the location information of the target UE. In response to the location report request, the base station obtains the report information including the identification of the IAB node connected to the target UE.

In some embodiments, in addition to the identification of the IAB node establishing a connection with the target UE, the base station can also obtain the identification of the base station corresponding to the target UE and/or the identification of the cell corresponding to the target UE and include it in the report information.

At S502, the report information is transmitted to the AMF network element, for the AMF or NEF network element to determine the location information of the UE based on the report information.

After obtaining the report information including the identification of the IAB node establishing a connection with the target UE, the base station transmits the report information to the AMF network element or reports it to the NEF network element through the AMF network element, enabling the AMF network element or NEF network element to determine the location information of the target UE based on the report information. Since the report information includes the identification of the IAB node that establishes a connection with the target UE, and as mentioned earlier, the IAB node is deployed in a fixed location, the identification of the IAB node can be mapped to a fixed area of the core network, the location information of the target UE can be determined based on the identification of the IAB node.

In the disclosed embodiment, by obtaining the report information including the identification of the IAB node corresponding to the target UE (UE to be located), the report information is transmitted to the AMF network element or NEF network element, so that the AMF network element or the NEF network element can determine the location information of the UE according to the identification of the IAB node, thereby avoiding the problem that the reported UE location information, such as the identification information of the cell to which the UE belongs, cannot accurately represent the current location of the UE, when the existing location reporting process is used for UE positioning.

FIG. 6 is a flowchart of another method for positioning a UE based on IAB according to an embodiment of the present disclosure, in which the IAB node is deployed in a fixed location, and the coverage range of the IAB node is a fixed area, and thus its identification can be mapped to a fixed area of the core network. When the UE to be located, i.e. the target UE, is a UE that is connected to the network through the IAB node in the fixed location, the following method can be used to achieve UE positioning. In this embodiment, the method is executed by a base station, as shown in FIG. 6, the method for positioning the UE includes the following steps.

At S601, in response to a location information report request for the UE, report information is obtained, the report information including identification of the IAB node corresponding to the UE.

After receiving the location information report request for the target UE, the base station obtains the report information about the target UE, which includes the identification of the IAB node corresponding to the target UE. The 'IAB node corresponding to the UE' can refer to the IAB node that establishes a connection with the UE, for example, the UE accesses the network through this IAB node.

In some embodiments, in response to a location service request for the target UE, such as receiving the location service request from the Application Function (AF) through the NEF network element, the AMF network element can trigger the location reporting process, during which the base station can obtain the identification of the IAB node that has established a connection with the target UE. Specifically, for example, after receiving the location service request for the target UE, the AMF network element can send a location report request to the base station to request the base station to report the location information of the target UE. In response to the location report request, the base station obtains the report information including the identification of the IAB node connected to the target UE.

In some embodiments, in addition to the identification of the IAB node establishing a connection with the target UE, the base station can also obtain the identification of the base station corresponding to the target UE and/or the identification of the cell corresponding to the target UE and include it into the report information.

At S602, it is determined whether the IAB node corresponding to the UE is an authorized IAB node.

When the UE accesses the network through an unauthorized IAB node, it may cause a security issue. To avoid this issue, the base station can determine whether the IAB node corresponding to the target UE is an authorized IAB node. When it is determined that the IAB node corresponding to the target UE is an authorized IAB node, S603 is executed. When it is determined that the IAB node corresponding to the target UE is not an authorized IAB node, the base station may not transmit the report information.

At S603, if the IAB node corresponding to the UE is an authorized IAB node, the report information including the identification of the IAB node is transmitted to the AMF network element.

When it is determined that the IAB node corresponding to the target UE is an authorized IAB node, the base station transmits the report information including the identification of the IAB node establishing a connection with the target UE to the AMF network element, enabling the AMF network element to determine the location information of the target UE based on the report information. Since the report information includes the identification of the IAB node that establishes a connection with the target UE, and as mentioned earlier, the IAB node is deployed in a fixed location, the identification of the IAB node can be mapped to a fixed area of the core network, and thus the location information of the target UE can be determined based on the identification of the IAB node.

In the disclosed embodiment, by obtaining the report information including the identification of the IAB node corresponding to the target UE (the UE to be located) and transmitting the report information to the AMF network element when it is determined that the IAB node corresponding to the target UE is an authorized IAB node, the AMF network element can determine the location information of the UE based on the identification of the IAB node, thereby avoiding the problem that the reported UE location information, such as the identification information of the cell to which the UE belongs, cannot accurately represent the current location of the UE, when the existing location reporting process is used for UE positioning. In addition, when it is determined that the IAB node corresponding to the target UE is an unauthorized IAB node, no report information is transmitted, thereby avoiding security issues caused by locating or transmitting data to the UE accessing the network through the unauthorized IAB node.

FIG. 7 is a flowchart of another method for positioning a UE based on IAB according to an embodiment of the present disclosure, in which the IAB node is deployed in a fixed location, and the coverage range of the IAB node is a fixed area, and thus its identification can be mapped to a fixed area of the core network. When the UE to be located, i.e. the target UE, is a UE that is connected to the network through the IAB node in the fixed location, the following method can be used to achieve UE positioning. In this embodiment, the method is executed by a base station, as shown in FIG. 7, the method for positioning the UE based on IAB includes the following steps.

At S701, in response to a location information report request for the UE, report information is obtained through a F1 interface between the base station and the IAB node or based on local configuration information. The report information includes the identification of the IAB node corresponding to the UE, and the local configuration information indicates the correspondence between the IAB node and the F1 interface.

After receiving the location information report request for the target UE, the base station obtains the report information about the target UE, which includes the identification of the IAB node corresponding to the target UE. The 'IAB node corresponding to the UE' can refer to the IAB node that establishes a connection with the UE, for example, the UE accesses the network through this IAB node.

In some embodiments, in response to a location service request for the target UE, such as receiving the location service request from the Application Function (AF) through the NEF network element, the AMF network element can trigger the location reporting process, during which the base station can obtain the identification of the IAB node that has established a connection with the target UE. Specifically, for example, after receiving the location service request for the target UE, the AMF network element can send a location report request to the base station to request the base station to report the location information of the target UE. In response to the location report request, the base station obtains the report information including the identification of the IAB node connected to the target UE.

In the IAB network, there is a communication link between the donor base station (which can be the IAB donor) and each IAB node through the F1 interface. Through this communication link, communication can be carried out between the donor base station and each IAB node. Therefore, the base station can obtain the report information including the identification of the IAB node from the IAB node corresponding to the target UE through the F1 interface. Alternatively, the base station can obtain the report information including the identification of the IAB node establishing a connection with the target UE, from the local configuration information. If the UE accesses the base station through an IAB node, and the base station is connected to the IAB node through the F1 interface, the base station can determine which F1 interface (or port) it receives the information of the UE through, and then obtain the identification of the IAB node corresponding to the F1 interface (or port) from the local configuration information. The local configuration information can indicate the correspondence between the IAB node and the F1 interface, for example, can indicate the F1 interface through whose port the IAB node is connected to the base station.

In some embodiments, in addition to the identification of the IAB node establishing a connection with the target UE, the base station can also obtain the identification of the base station corresponding to the target UE and/or the identification of the cell corresponding to the target UE and include it in the report information.

At S702, the report information is transmitted to the AMF network element, for the AMF network element to determine the location information of the UE based on the report information.

After obtaining the report information including the identification of the IAB node establishing a connection with the target UE, the base station transmits the report information to the AMF network element, enabling the AMF network element to determine the location information of the target UE based on the report information. Since the report information includes the identification of the IAB node that establishes a connection with the target UE, and as mentioned earlier, the IAB node is deployed in a fixed location, and the identification of the IAB node can be mapped to a fixed area of the core network, the location information of the target UE can be determined based on the identification of the IAB node.

In the disclosed embodiment, by obtaining the report information including the identification of the IAB node corresponding to the target UE (the UE to be located), the report information is transmitted to the AMF network element, enabling the AMF network element to determine the location information of the UE based on the identification of the IAB node, thereby avoiding the problem that the reported UE location information, such as the identification information of the cell to which the UE belongs, cannot accurately represent the current location of the UE, when the existing location reporting process is used for UE positioning. By using the F1 interface between the base station and the IAB node, corresponding information can be directly obtained from the IAB node corresponding to the target UE.

In some embodiments, in order to avoid security issues caused by accessing the network through the unauthorized IAB node, the base station can determine whether the IAB node corresponding to the target UE is an authorized IAB node. When it is determined that the IAB node corresponding to the target UE is an authorized IAB node, the report information including the identification of the IAB node establishing a connection with the target UE is transmitted to the AMF network element, enabling the AMF network element to determine the location information of the target UE based on the report information. When it is determined that the IAB node corresponding to the target UE is not an authorized IAB node, the base station may not transmit the report information, thereby avoiding security issues caused by locating or transmitting data to the UE accessing the network through the unauthorized IAB node.

FIG. 8 is a flowchart of another method for positioning a UE based on IAB according to an embodiment of the present disclosure, in which the IAB node is deployed in a fixed location, and the coverage range of the IAB node is a fixed area, and thus its identification can be mapped to a fixed area of the core network. When the UE to be located, i.e. the target UE, is a UE that is connected to the network through the IAB node in the fixed location, the following method can be used to achieve UE positioning. In this embodiment, the method is executed by a base station, as shown in FIG. 8, the method for positioning the UE based on IAB includes the following steps.

At S801, in response to a location information report request for the UE, report information is obtained through NR Uu links between various IAB nodes, the report information including identification of the IAB node corresponding to the UE.

After receiving the location information report request for the target UE, the base station obtains the report information about the target UE, which includes the identification of the IAB node corresponding to the target UE. The 'IAB node corresponding to the UE' can refer to the IAB node that establishes a connection with the UE, for example, the UE accesses the network through this IAB node.

In some embodiments, in response to a location service request for the target UE, such as receiving the location service request from the Application Function (AF) through the NEF network element, the AMF network element can trigger the location reporting process, during which the base station can obtain the identification of the IAB node that has established a connection with the target UE. Specifically, for example, after receiving the location service request for the target UE, the AMF network element can send a location report request to the base station to request the base station to report the location information of the target UE. In response to the location report request, the base station obtains the report information including the identification of the IAB node connected to the target UE.

In an IAB network, when there are multiple IAB nodes, multiple IAB nodes can be cascaded through NR Uu links. For example, the first IAB node is connected to the second IAB node through an NR Uu link, the second IAB node is connected to the third IAB node through an NR Uu link, and so on. The $(N-1)^{th}$ IAB node is connected to the $N^{th}$ IAB node through an NR Uu link, and the $N^{th}$ IAB node is connected to the donor base station through an NR Uu link. The base station can obtain the report information including the identification of the IAB node from the IAB node corresponding to the target UE through the NR Uu links between respective IAB nodes.

For example, for a network with four IAB nodes, where the first IAB node is connected to the second IAB node via the NR Uu link, the second IAB node is connected to the third IAB node via the NR Uu link, the third IAB node is connected to the fourth IAB node via the NR Uu link, and the fourth IAB node is connected to the donor base station via the NR Uu link, if the IAB node corresponding to the target UE is the first IAB node, then the base station can obtain the report information including the identification of the IAB node through the NR Uu link between the first IAB node and the second IAB node, the NR Uu link between the second IAB node and the third IAB node, the NR Uu link between the third IAB node and the fourth IAB node, and the NR Uu link between the fourth IAB node and the donor base station. If the IAB node corresponding to the target UE is the third IAB node, the base station can obtain the report information including the identification of the IAB node through the NR Uu link between the third IAB node and the fourth IAB node, as well as the NR Uu link between the fourth IAB node and the donor base station.

In some embodiments, in addition to the identification of the IAB node establishing a connection with the target UE, the base station can also obtain the identification of the base station corresponding to the target UE and/or the identification of the cell corresponding to the target UE and include it in the report information.

At S802, the report information is transmitted to the AMF network element, for the AMF network element to determine the location information of the UE based on the report information.

After obtaining the report information including the identification of the IAB node establishing a connection with the target UE, the base station transmits the report information to the AMF network element, enabling the AMF network element to determine the location information of the target UE based on the report information. Since the report information includes the identification of the IAB node that establishes a connection with the target UE, and as mentioned earlier, the IAB node is deployed in a fixed location, and the identification of the IAB node can be mapped to a fixed area of the core network, the location information of the target UE can be determined based on the identification of the IAB node.

In the disclosed embodiment, by obtaining the report information including the identification of the IAB node corresponding to the target UE (the UE to be located), the report information is transmitted to the AMF network element, enabling the AMF network element to determine the location information of the UE based on the identification of the IAB node, thereby avoiding the problem that the reported UE location information, such as the identification information of the cell to which the UE belongs, cannot accurately represent the current location of the UE, when the existing location reporting process is used for UE positioning. By using the NR Uu links between various IAB nodes, the wireless backhaul links can be used to reliably obtain the corresponding information from the IAB node corresponding to the target UE.

In some embodiments, in order to avoid security issues caused by accessing the network through the unauthorized IAB node, the base station can determine whether the IAB node corresponding to the target UE is an authorized IAB node. When it is determined that the IAB node corresponding to the target UE is an authorized IAB node, the report information including the identification of the IAB node establishing a connection with the target UE is transmitted to the AMF network element, enabling the AMF network element to determine the location information of the target UE based on the report information. When it is determined that the IAB node corresponding to the target UE is not an authorized IAB node, the base station may not transmit the report information, thereby avoiding security issues caused by locating or transmitting data to the UE accessing the network through the unauthorized IAB node.

FIG. 9 shows a flowchart of a method for positioning a UE based on IAB according to an embodiment of the present disclosure, in which the IAB node is deployed in a fixed location. When the IAB node is located in a fixed location, the coverage range of the IAB node is a fixed area, and therefore its identification can be mapped to a fixed area of the core network. When the UE to be located, i.e. the target UE, is a UE that is connected to the network through the IAB node in the fixed location, the following method can be used to achieve UE positioning. In this embodiment, the method is executed by a NEF network element, as shown in FIG. 9, the method for positioning the UE based on IAB includes the following steps.

At S901, in response to a location service request for the UE, report information about the UE is obtained from the AMF network element, the report information including the identification of the IAB node corresponding to the UE.

When the NEF network element receives the location service request for the target UE, such as from the Application Function (AF), the NEF network element can obtain the report information about the target UE from the AMF network element, in which the report information includes the identification of the IAB node corresponding to the target UE. The 'IAB node corresponding to the UE' can refer to the IAB node that establishes a connection with the UE, for example, the UE accesses the network through this IAB node.

In some embodiments, in response to the location service request for the target UE, the NEF network element can send the location service request to the AMF network element. The AMF network element can trigger the location reporting process in response to the request. During the location reporting process, the base station can report the identification of the IAB node connected to the target UE to the AMF network element, which transmits the identification of the IAB node to the NEF network element. Specifically, for example, after receiving the location service request for the target UE from the NEF network element, the AMF network element can send a location report request to the base station to request that the base station reports the location information of the target UE. In response to the location report request, the base station transmits the report information, including the identification of the IAB node that establishes a connection with the target UE, to the AMF network element, which then transmits the received report information to the NEF network element.

At S902, the location information of the UE is determined based on the report information.

After obtaining the report information, the NEF network element can determine the location information of the target UE based on the report information. Since the report information received by the NEF network element includes the identification of the IAB node establishing a connection with the target UE, and as mentioned earlier, the IAB node is deployed in a fixed location, and the identification of the IAB node can be mapped to a fixed area of the core network, the location information of the target UE can be determined based on the identification of the IAB node.

In the disclosed embodiment, by obtaining the report information including the identification of the IAB node corresponding to the target UE (UE to be located), the location information of the UE is determined based on the report information, thereby avoiding the problem that the reported UE location information, such as the identification information of the cell to which the UE belongs, cannot accurately represent the current location of the UE, when the existing location reporting process is used for UE positioning.

FIG. 10 is a flowchart of a method for positioning a UE based on IAB according to an embodiment of the present disclosure. An IAB node is deployed in a fixed location, and the coverage range of the IAB node is a fixed area, and thus its identification can be mapped to a fixed area of the core network. When the UE to be located, i.e. the target UE, is a UE that is connected to the network through the IAB node in the fixed location, the following method can be used to achieve UE positioning. In this embodiment, the method is executed by a NEF network element, as shown in FIG. 10, the method for positioning the UE based on IAB includes the following steps.

At S1001, in response to a location service request for the UE, report information about the UE is obtained from an AMF network element, the report information including identification of the IAB node corresponding to the UE.

When the NEF network element receives the location service request for the target UE, such as from the Application Function (AF), the NEF network element can obtain the report information about the target UE from the AMF network element, in which the report information includes the identification of the IAB node corresponding to the target UE. The 'IAB node corresponding to the UE' can refer to the IAB node that establishes a connection with the UE, for example, the UE accesses the network through this IAB node.

In some embodiments, in response to the location service request for the target UE, the NEF network element can send the location service request to the AMF network element. The AMF network element can trigger the location reporting process in response to the request. During the location reporting process, the base station can report the identification of the IAB node connected to the target UE to the AMF network element, which transmits the identification of the IAB node to the NEF network element. Specifically, for example, after receiving the location service request for the target UE from the NEF network element, the AMF network element can send a location report request to the base station to request that the base station reports the location information of the target UE. In response to the location report request, the base station transmits the report information, including the identification of the IAB node that establishes a connection with the target UE, to the AMF network element, which then transmits the received report information to the NEF network element.

In some embodiments, in addition to the identification of the IAB node establishing a connection with the target UE, the identification of the base station corresponding to the target UE and the identification of the cell corresponding to the target UE can also be reported to the NEF network element.

At S1002, a coverage range of the IAB node is determined based on a preset configuration list and the identification of the IAB node included in the report information. The preset configuration list stores a correspondence relationship between the identification and coverage ranges of the IAB nodes.

After obtaining the report information, the NEF network element can determine the location information of the target UE based on the report information.

Specifically, since the coverage range of the IAB node located in a fixed location is a fixed area, a configuration list can be specified in advance, where for each IAB node located in a fixed location, its coverage range can be specified. For example, in this configuration list, the relationship between the identification of IAB nodes located in fixed locations and their coverage ranges can be stored.

This configuration list can be configured in the AMF network element, the NEF network element, or both.

In this embodiment, the configuration list is configured in the NEF network element or has been obtained by the NEF network element from the AMF network element. After the NEF network element receives the report information including the identification of the IAB node establishing a connection with the target UE, the NEF network element can obtain the coverage range of the IAB node establishing a connection with the target UE based on the configuration list, for example, by querying the configuration list and obtaining the coverage range of the IAB node based on the identification of the IAB node.

At S1003, location information of the UE is determined based on the coverage range of the IAB node, the identification of the base station corresponding to the UE, and the identification of the service cell corresponding to the UE.

After determining the coverage range of the IAB node that establishes a connection with the target UE, the location information of the UE can be determined based on the coverage range, the identification of the base station corresponding to the UE, and the identification of the service cell corresponding to the UE. For example, as shown in FIG. 1, after determining the coverage range of the IAB node 2 that establishes a connection with the UE, it can be determined that the UE is within the coverage range of IAB node2. Then, the specific location information of the UE can be determined based on the identification of the base station corresponding to the UE and the identification of the service cell corresponding to the UE.

In the disclosed embodiment, by obtaining the report information including the identification of the IAB node corresponding to the target UE (UE to be located), the coverage range of the IAB node is determined based on the report information, and the location information of the UE is determined based on the coverage range of the IAB node, thereby avoiding the problem that the reported UE location information, such as the identification information of the cell to which the UE belongs, cannot accurately represent the current location of the UE, when the existing location reporting process is used for UE positioning.

FIG. 11 shows a flowchart of a method for positioning a UE based on IAB according to an embodiment of the present disclosure, in which an IAB node is deployed on a movable object. When the UE to be located, i.e. the target UE, is a UE connected to the network through an IAB node on a movable object (also known as a movable IAB node), UE positioning can be achieved using the method shown below. In this embodiment, the method is executed by an AMF network element, as shown in FIG. 11, the method for positioning the UE based on IAB includes the following steps.

At S1101, in response to a location service request for the UE, subscription information of the UE and identification of a movable IAB node corresponding to the UE is obtained from the UDM platform. The UDM platform stores a correspondence relationship the between UE and the identification of the movable IAB node, and the subscription information of the UE. The subscription information indicates whether UE is a business user of the movable IAB node.

When the target UE is connected to the network through an IAB node on a movable object, since the IAB node is located on the movable object, the coverage range of the IAB node is not fixed, that is, it changes with the movement of the movable object. In this case, positioning the UE requires real-time tracking of the UE, which may cause complex communication processes. Moreover, communication operations of the UE during the positioning process can lead to significant power consumption of the UE.

However, when an IAB node is located on a movable object, the UE accessing the network through the IAB node is usually also located on the movable object, so the location information of the movable IAB node can be considered as the location information of the UE accessing the network through it.

When the AMF network element receives the location service request for the target UE, for example, receives the location service request through the NEF network element from the Application Function (AF), the AMF network element can obtain the identification of the movable IAB node corresponding to the target UE from the UDM platform. The 'movable IAB node corresponding to the UE' can refer to a movable IAB node that establishes a connection with the UE, for example, the UE accesses the network through the movable IAB node. The UDM platform stores the correspondence relationship between the identification of the movable IAB node and the UE, and the subscription information of the UE. The subscription information of the UE can indicate whether the UE is a business user of the movable IAB node.

In some embodiments, when the UE registers with the network through a movable IAB node, the correspondence relationship between the UE and the identification of the movable IAB node can be stored on the UDM platform based on the identification of the movable IAB node and the UE. For example, when the UE expects to register with the network through a movable IAB node, the UE can provide the identification of the movable IAB node, and when the UE successfully registers with the network through the movable IAB node, the correspondence relationship between the UE and the identification of the movable IAB node can be stored on the UDM platform.

In some embodiments, the subscription information of the UE can be prestored on the UDM platform. For example, when the UE is authorized to become a business user of a movable IAB node through related services, the subscription information indicating that the UE is the business user of the movable IAB node can be stored on the UDM platform. In other embodiments, the subscription information of the UE can be written to the UDP platform when the UE registers with the network through a movable IAB node. For example, when the UE registers with the network through a movable IAB node, the subscription information indicating that the UE is the business user of the movable IAB node is stored on the UDM platform based on the indication information provided by the UE indicating that it is the business user of the movable IAB node. Of course, there are other ways to store the subscription information of the UE on the UDM platform, which will not be elaborated here.

At S1102, if the subscription information indicates that the UE is the business user of the movable IAB node, location information of the IAB node is obtained from the base station based on the identification of the IAB node.

After obtaining the subscription information indicating that the UE is the business user of the movable IAB node and obtaining the identification of the IAB node, the AMF network element can obtain the location information about the IAB node from the base station.

In some embodiments, the AMF network element can trigger a location reporting process based on the identification of the IAB node corresponding to the target UE. During this location reporting process, the base station can report the location information of the IAB node to the AMF network element. Specifically, for example, after obtaining the identification of the IAB node, the AMF network element can send a location report request to the base station to request that the base station reports the location information of the IAB node. In response to the location report request, the base station transmits the location information of the IAB node to the AMF network element.

In some embodiments, the location information of the IAB node establishing a connection with the target UE includes the identification of the base station corresponding to the IAB node and the identification of the cell corresponding to the IAB node.

At S1103, location information of the UE is determined based on the location information of the IAB node.

After obtaining the location information of the IAB node corresponding to the target UE, the AMF network element can determine the location information of the IAB node as the location information of the target UE.

In the disclosed embodiment, the identification of the IAB node corresponding to the target UE can be obtained from the UDM platform, and the location information of the IAB node can be obtained based on the identification of the IAB node as the location information of the target UE. This avoids the complex communication process required for tracking the UE located on a movable object and avoids the power consumption of the UE in this complex communication process, thereby simplifying the UE positioning process and saving the power consumption of the UE.

FIG. 12 shows a flowchart of a method for positioning a UE based on IAB according to an embodiment of the present disclosure, in which IAB nodes are deployed on movable objects, e.g. a vehicle or a UAV. When the UE to be located, i.e. the target UE, is a UE connected to the network through an IAB node on the movable object (also known as a movable IAB node), UE positioning can be achieved using the method shown below. In this embodiment, the method is executed by GMLC, as shown in FIG. 12, the method for positioning the UE based on IAB includes the following steps.

At S1201, in response to a location service request for the UE, subscription information of the UE and identification of a movable IAB node corresponding to the UE is obtained from the UDM platform. The UDM platform stores the correspondence relationship between the UE and the identification of the movable IAB node, as well as the subscription information of the UE. The subscription information indicates whether the UE is a business user of the movable IAB node.

When the target UE is connected to the network through an IAB node on a movable object, since the IAB node is on the movable object, the coverage range of the IAB node is not fixed, that is, it changes with the movement of the movable object. In this case, positioning the UE requires real-time tracking of the UE, which may cause complex communication process. Moreover, the communication operations of the UE during the positioning process can lead to significant power consumption of the UE.

However, when the IAB node is located on the movable object, the UE accessing the network through the IAB node is usually also located on the movable object, so the location information of the movable IAB node can be considered as the location information of the UE accessing the network through it.

When the GMLC receives the location service request for the target UE, for example, receives the location service request through the NEF network element from the Application Function (AF), the GMLC can obtain the identification of the movable IAB node corresponding to the target UE from the UDM platform. The 'movable IAB node corresponding to the UE' can refer to a movable IAB node that establishes a connection with the UE, for example, the UE accesses the network through the movable IAB node.

The UDM platform stores the correspondence between the identification of the movable IAB node and the UE, as well as the subscription information of the UE. The subscription information of the UE can indicate whether the UE is a business user of the movable IAB node.

In some embodiments, when the UE registers with the network through a movable IAB node, the correspondence relationship between the UE and the identification of the movable IAB node can be stored on the UDM platform based on the identification of the movable IAB node and the UE. For example, when the UE expects to register with the network through a movable IAB node, the UE can provide the identification of the movable IAB node, and when the UE successfully registers with the network through the movable IAB node, the correspondence relationship between the UE and the identification of the movable IAB node can be stored on the UDM platform.

In some embodiments, the subscription information of the UE can be prestored on the UDM platform. For example, when the UE is authorized to become a business user of a movable IAB node through related services, the subscription information indicating that the UE is the business user of the movable IAB node can be stored on the UDM platform. In other embodiments, the subscription information of the UE can be written to the UDP platform when the UE registers with the network through a movable IAB node. For example, when the UE registers with the network through a movable IAB node, the subscription information indicating that the UE is a business user of the movable IAB node is stored on the UDM platform based on the indication information provided by the UE indicating that it is a business user of the movable IAB node. Of course, there are other ways to store the subscription information of the UE on the UDM platform, which will not be elaborated here.

At S1202, when the subscription information indicates that the UE is the business user of the movable IAB node, location information of the IAB node is obtained through the location management function (LMF) network element based on the identification of the IAB node.

After obtaining the subscription information indicating that the UE is the business user of the movable IAB node and obtaining the identification of the IAB node, the GMLC can obtain the location information about the IAB node through the LMF network element.

In some embodiments, the GMLC can trigger a location reporting process based on the identification of the IAB node corresponding to the target UE. During this location reporting process, the base station can report the location information of the IAB node to the GMLC. Specifically, for example, after obtaining the identification of the IAB node, the GMLC can send a location report request to the LMF network element through the AMF network element to request that the LMF network element reports the location information of the IAB node. The LMF network element obtains the precise location of the IAB node based on the information reported by the base station and the UE, such as obtaining geographic location information of the IAB node in a graphical form, and reports it to the GMLC.

In some embodiments, the location information of the IAB node that establishes a connection with the target UE includes the geographic location information of the IAB node in a graphical form.

At S1203, location information of the UE is determined based on the location information of the IAB node.

After obtaining the location information of the IAB node corresponding to the target UE, the GMLC can determine the location information of the IAB node as the location information of the UE. Specifically, the GMLC can determine the specific location information of the target UE based on the geographic location information of the IAB node in the graphical form.

In the disclosed embodiment, the identification of the IAB node corresponding to the target UE can be obtained from the UDM platform, and the location information of the IAB node can be obtained based on the identification of the IAB node as the location information of the target UE. This avoids the complex communication process required for tracking the UE located on a movable object and avoids the power consumption of the UE in this complex communication process, thereby simplifying the UE positioning process and saving the power consumption of the UE.

FIG. 13 shows a flowchart of a method for positioning a UE based on IAB according to an embodiment of the present disclosure, in which IAB nodes are deployed on movable objects. When the UE to be located, i.e. the target UE, is a UE connected to the network through an IAB node on the movable object (also known as a movable IAB node), UE positioning can be achieved using the method shown below. In this embodiment, the method is executed by a NEF network element, as shown in FIG. 13, the method for positioning the UE based on IAB includes the following steps.

At S1301, in response to a location service request for the UE, subscription information of the UE and identification of the movable IAB node corresponding to the UE is obtained from the UDM platform. The UDM platform stores the correspondence relationship between the UE and the identification of the movable IAB node, as well as the subscription information of the UE. The subscription information indicates whether the UE is a business user of the movable IAB node.

When the target UE is connected to the network through an IAB node on a movable object, since the IAB node is on the movable object, the coverage range of the IAB node is not fixed, that is, it changes with the movement of the movable object. In this case, positioning the UE requires real-time tracking of the UE, which may cause complex communication process. Moreover, the communication operations of the UE during the positioning process can lead to significant power consumption of the UE.

However, when an IAB node is located on a movable object, the UE accessing the network through the IAB node is usually also located on the movable object, and thus the location information of the movable IAB node can be considered as the location information of the UE accessing the network through it.

When the NEF network element receives the location service request for the target UE, such as from the Application Function (AF), the NEF network element can obtain the identification of the movable IAB node corresponding to the target UE from the UDM platform. The 'movable IAB node corresponding to the UE' can refer to a movable IAB node that establishes a connection with the UE, for example, the UE accesses the network through the movable IAB node. The UDM platform stores the correspondence between the identification of the movable IAB node and the UE, as well as the subscription information of the UE. The subscription information of the UE can indicate whether the UE is a business user of the movable IAB node.

In some embodiments, when the UE registers with the network through a movable IAB node, the correspondence relationship between the UE and the identification of the movable IAB node can be stored on the UDM platform based on the identification of the movable IAB node and the UE. For example, when the UE expects to register with the network through a movable IAB node, the UE can provide the identification of the movable IAB node, and when the UE successfully registers with the network through the movable IAB node, the correspondence relationship between the UE and the identification of the movable IAB node can be stored on the UDM platform.

In some embodiments, the subscription information of the UE can be prestored on the UDM platform. For example, when the UE is authorized to become a business user of a movable IAB node through related services, the subscription information indicating that the UE is the business user of the movable IAB node can be stored on the UDM platform. In other embodiments, the subscription information of the UE can be written to the UDP platform when the UE registers with the network through a movable IAB node. For example, when the UE registers with the network through a movable IAB node, the subscription information indicating that the UE is a business user of the movable IAB node is stored on the UDM platform based on the indication information provided by the UE indicating that it is the business user of the movable IAB node. Of course, there are other ways to store the subscription information of the UE on the UDM platform, which will not be elaborated here.

At S1302, when the subscription information indicates that UE is the business user of the movable IAB node, location information of the IAB node is obtained from an AMF network element or GMLC based on the identification of the IAB node.

After obtaining the subscription information indicating that the UE is the business user of the movable IAB node and obtaining the identification of the IAB node, the NEF network element can obtain the location information about the IAB node from the AMF network element or GMLC.

In some embodiments, after obtaining the identification of the IAB node, the NEF network element can send the identification of the IAB node to the AMF network element or GMLC, enabling the AMF network element or GMLC to trigger the location reporting process based on the identification of the IAB node corresponding to the target UE. During the location reporting process, the base station can report the location information of the IAB node to the AMF network element or GMLC, and the AMF network element or GMLC will transmit the received location information to the NEF network element. Specifically, for example, after obtaining the identification of the IAB node, the AMF network element can send a location report request to the base station to request that the base station reports the location information of the IAB node. In response to the location report request, the base station transmits the location information of the IAB node (such as the identification of the base station corresponding to the IAB node and/or the identification of the cell corresponding to the IAB node) to the AMF network element. The AMF network element transmits the received location information of the IAB nodes to the NEF network element. Alternatively, after obtaining the identification of the IAB node, GMLC can send a location report request to the LMF network element through the AMF network element to request the LMF network element to report the location information of the IAB node. The LMF network element obtains the precise location of the IAB node based on the information reported by the base station and the UE, such as obtaining geographic location information of the IAB node in a graphical form, and reports it to GMLC, while GMLC transmits the received location information of the IAB node to the NEF network element.

In some embodiments, the location information of the IAB node that establishes a connection with the target UE includes the identification of the base station corresponding to the IAB node, the geographic location information of the IAB node in graphical form, and the identification of the cell corresponding to the IAB node.

At S1303, location information of the UE is determined based on the location information of the IAB node.

After obtaining the location information of the IAB node corresponding to the target UE, the NEF network element can determine the location information of the IAB node as the location information of the target UE.

In the disclosed embodiment, the identification of the IAB node corresponding to the target UE can be obtained from the UDM platform, and the location information of the IAB node can be obtained based on the identification of the IAB node as the location information of the target UE. This avoids the complex communication process required for tracking the UE located on a movable object and avoids the power consumption of the UE in this complex communication process, thereby simplifying the UE positioning process and saving the power consumption of the UE.

Figure 15:
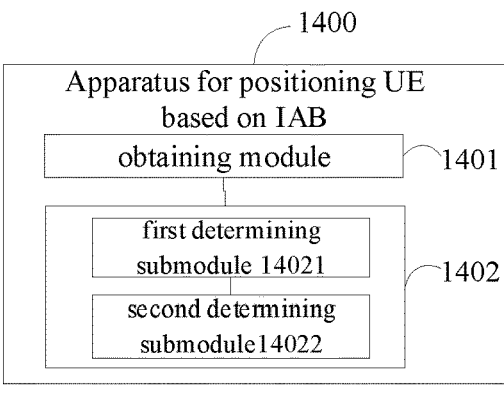
FIG. 15 is a bock diagram of an apparatus for positioning a UE based on IAB according to an embodiment of the present disclosure.
Figure 16:
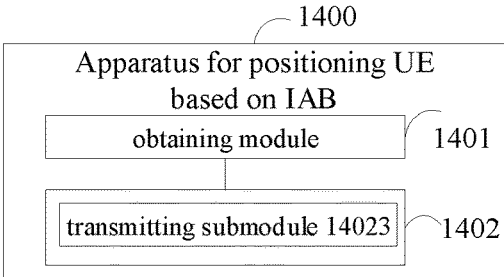
FIG. 16 is a bock diagram of an apparatus for positioning a UE based on IAB according to an embodiment of the present disclosure.

Corresponding to the method for positioning a UE based on IAB provided by the aforementioned embodiments, the present disclosure also provides an apparatus for positioning a UE based on IAB. As the apparatus for positioning a UE based on IAB provided by the embodiments of the present disclosure corresponds to the method for positioning a UE based on IAB provided by the aforementioned embodiments, the implementation of the method for positioning a UE based on IAB is also applicable to the apparatus for positioning a UE based on IAB provided by embodiments of the present disclosure, which will not be described in detail here. FIGS. 14 to 16 are block diagrams of the apparatus for positioning a UE based on IAB proposed in accordance with the present disclosure.

FIG. 14 is a block diagram of an apparatus for positioning a UE based on IAB provided by an embodiment of the present disclosure. IAB nodes are deployed in fixed locations, and this apparatus is applied to an AMF network element.

As shown in FIG. 14, the apparatus 1400 for positioning a UE based on IAB includes an obtaining module 1401 and a determining module 1402.

The obtaining module 1401 is configured to obtain report information about the UE from a base station in response to a location service request for the UE, the report information including identification of an IAB node corresponding to the UE.

The determining module 1402 is configured to determine location information of the UE based on the report information.

In the disclosed embodiment, by obtaining the report information including the identification of the IAB node corresponding to the target UE (the UE to be located), the location information of the UE is determined based on the report information, thereby avoiding the problem that the reported UE location information, such as the identification information of the cell to which the UE belongs, cannot accurately represent the current location of the UE, when the existing location reporting process is used for UE positioning.

In an embodiment of the present disclosure, as shown in FIG. 15, the determining module 1402 includes a first determining submodule 14021 and a second determining submodule 14022.

The first determining submodule 14021 is configured to determine a coverage range of the IAB node based on a preset configuration list and the identification of the IAB node included in the report information, wherein the preset configuration list stores a correspondence relationship between the identification and the coverage range of the IAB node.

The second determining submodule 14022 is configured to determine the location information of the UE based on the coverage range of the IAB node.

In the disclosed embodiment, by obtaining the report information including the identification of the IAB node corresponding to the target UE (UE to be located), the coverage range of the IAB node is determined based on the report information, and the location information of the UE is determined based on the coverage range of the IAB node, thereby avoiding the problem that the reported UE location information, such as the identification information of the cell to which the UE belongs, cannot accurately represent the current location of the UE, when the existing location reporting process is used for UE positioning.

In some embodiments, in addition to the identification of the IAB node establishing a connection with the target UE, the report information also includes the identification of the base station corresponding to the target UE and/or the identification of the cell corresponding to the target UE.

In an embodiment of the present disclosure, as shown in FIG. 16, the determining module 1402 includes a transmitting submodule 14023.

The transmitting submodule 14023 is configured to transmit the report information to a network exposure function (NEF) network element, for the NEF network element to determine the location information of the UE based on at least one of the identification of the IAB node, the identification of the base station corresponding to the UE, and the identification of the service cell corresponding to the UE included in the report information.

In the disclosed embodiment, by obtaining the report information including the identification of the IAB node corresponding to the target UE (the UE to be located), and sending the report information to the NEF network element, the NEF network element can determine the location information of the UE based on the report information, thereby avoiding the problem that the reported UE location information, such as the identification information of the cell to which the UE belongs, cannot accurately represent the current location of the UE, when the existing location reporting process is used for UE positioning.

Figure 17:
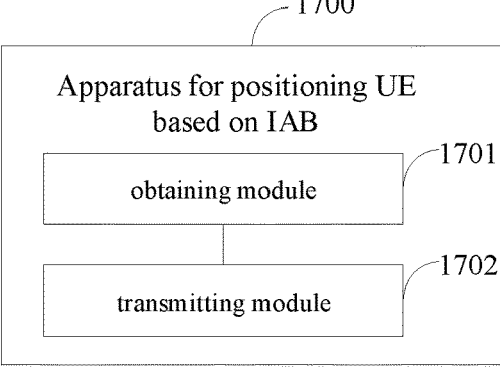
FIG. 17 is a bock diagram of another apparatus for positioning a UE based on IAB according to an embodiment of the present disclosure.
Figure 18:
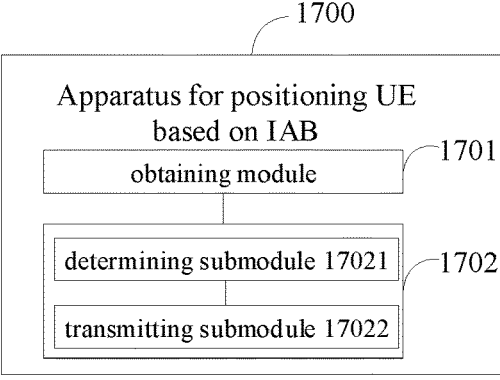
FIG. 18 is a bock diagram of another apparatus for positioning a UE based on IAB according to an embodiment of the present disclosure.

Corresponding to the method for positioning a UE based on IAB provided by the aforementioned embodiments, the present disclosure also provides an apparatus for positioning a UE based on IAB. As the apparatus for positioning a UE based on IAB provided by the embodiments of the present disclosure corresponds to the method for positioning a UE based on IAB provided by the aforementioned embodiments, the implementation of the method for positioning a UE based on IAB is also applicable to the apparatus for positioning a UE based on IAB provided by embodiments of the present disclosure, which will not be described in detail here. FIGS. 17 to 18 are block diagrams of the apparatus for positioning a UE based on IAB proposed in accordance with the present disclosure.

FIG. 17 is a block diagram of an apparatus for positioning a UE based on IAB provided by an embodiment of the present disclosure. IAB nodes are deployed in fixed locations, and this apparatus is applied to a base station.

As shown in FIG. 17, the apparatus 1700 for positioning a UE based on IAB includes an obtaining module 1701 and a transmitting module 1702.

The obtaining module 1701 is configured to obtain report information in response to a location information report request for the UE, in which the report information includes identification of an IAB node corresponding to the UE.

The transmitting module 1702 is configured to transmit the report information to an access and mobility management function (AMF) network element, for the AMF network element or a NEF network element to determine location information of the UE based on the report information.

In the disclosed embodiment, by obtaining the report information including the identification of the IAB node corresponding to the target UE (the UE to be located), and transmitting the report information to the AMF network element, the AMF network element or NEF network element can determine the location information of the UE based on the identification of the IAB node, thereby avoiding the problem that the reported UE location information, such as the identification information of the cell to which the UE belongs, cannot accurately represent the current location of the UE, when the existing location reporting process is used for UE positioning.

In an embodiment of the present disclosure, as shown in FIG. 18, the transmitting module 1702 includes a determining submodule 17021 and a transmitting submodule 17022.

The determining submodule 17021 is configured to determine whether the IAB node corresponding to the UE is an authorized IAB node.

The transmitting submodule 17022 is configured to transmit the report information including the identification of the IAB node to the AMF network element, when the IAB node corresponding to the UE is an authorized IAB node.

In the disclosed embodiment, by obtaining the report information including the identification of the IAB node corresponding to the target UE (the UE to be located) and transmitting the report information to the AMF network element when it is determined that the IAB node corresponding to the target UE is an authorized IAB node, the AMF network element can determine the location information of the UE based on the identification of the IAB node, thereby avoiding the problem that the reported UE location information, such as the identification information of the cell to which the UE belongs, cannot accurately represent the current location of the UE, when the existing location reporting process is used for UE positioning. In addition, when it is determined that the IAB node corresponding to the target UE is an unauthorized IAB node, no report information is transmitted, thereby avoiding security issues caused by locating or transmitting data to the UE accessing the network through the unauthorized IAB node.

In some embodiments, the obtaining module 1701 is configured to obtain the report information through a F1 interface between the base station and the IAB node or based on local configuration information, wherein the local configuration information indicates the correspondence between the IAB node and the F1 interface. By using the F1 interface between the base station and the IAB node or based on local configuration information, the corresponding information can be directly obtained from the IAB node corresponding to the target UE.

In some embodiments, the obtaining module 1701 is configured to obtain the report information through NR Uu links between various IAB nodes. By using the NR Uu links between various IAB nodes, the wireless backhaul link can be used to reliably obtain corresponding information from the IAB node corresponding to the target UE.

In some embodiments, in addition to the identification of the IAB node establishing a connection with the target UE, the report information also includes the identification of the base station corresponding to the target UE and the identification of the cell corresponding to the target UE.

Figure 19:
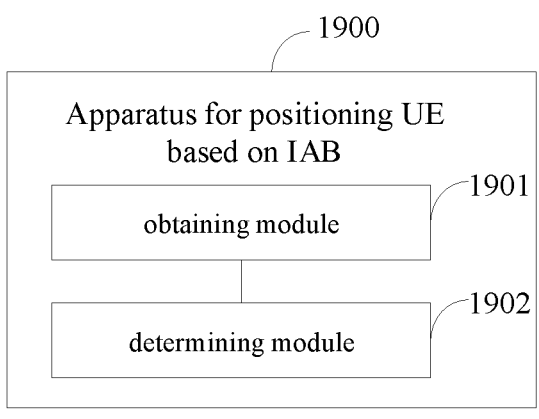
FIG. 19 is a bock diagram of yet another apparatus for positioning a UE based on IAB according to an embodiment of the present disclosure.
Figure 20:
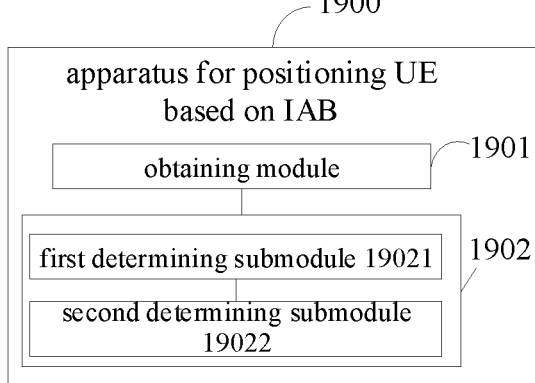
FIG. 20 is a bock diagram of yet another apparatus for positioning a UE based on IAB according to an embodiment of the present disclosure.

Corresponding to the method for positioning a UE based on IAB provided by the aforementioned embodiments, the present disclosure also provides an apparatus for positioning a UE based on IAB. As the apparatus for positioning a UE based on IAB provided by the embodiments of the present disclosure corresponds to the method for positioning a UE based on IAB provided by the aforementioned embodiments, the implementation of the method for positioning a UE based on IAB is also applicable to the apparatus for positioning a UE based on IAB provided by embodiments of the present disclosure, which will not be described in detail here. FIGS. 19 to 20 are block diagrams of the apparatus for positioning a UE based on IAB proposed in accordance with the present disclosure.

FIG. 19 is a block diagram of an apparatus for positioning a UE based on IAB provided by an embodiment of the present disclosure. IAB nodes are deployed in fixed locations, and this apparatus is applied to a NEF network element.

As shown in FIG. 19, the apparatus 1900 for positioning a UE based on IAB includes an obtaining module 1901 and a determining module 1902.

The obtaining module 1901 is configured to obtain report information about the UE from an access and mobility management function (AMF) network element in response to a location service request for the UE, the report information including identification of an IAB node corresponding to the UE.

The determining module 1902 is configured to determine location information of the UE based on the report information.

In the disclosed embodiment, by obtaining the report information including the identification of the IAB node corresponding to the target UE (UE to be located), the location information of the UE is determined based on the report information, thereby avoiding the problem that the reported UE location information, such as the identification information of the cell to which the UE belongs, cannot accurately represent the current location of the UE, when the existing location reporting processes is used for UE positioning.

In an embodiment of the present disclosure, in addition to the identification of the IAB node establishing a connection with the target UE, the report information also includes the identification of the base station corresponding to the target UE and the identification of the cell corresponding to the target UE. As shown in FIG. 20, The determining module 1902 includes a first determining submodule 19021 and a second determining submodule 19022.

The first determining submodule 19021 is configured to determine the coverage range of the IAB node based on a preset configuration list and the identification of the IAB node included in the report information, wherein the preset configuration list stores the correspondence relationship between the identification of the IAB node and its coverage range.

The second determining submodule 19022 is configured to determine the location information of the UE based on the coverage range of the IAB node, the identification of the base station corresponding to the UE, and the identification of the service cell corresponding to the UE.

In the disclosed embodiment, by obtaining the report information including the identification of the IAB node corresponding to the target UE (the UE to be located), the coverage range of the IAB node is determined according to the report information, and the location information of the UE is determined according to the coverage range of the IAB node, thereby avoiding the problem that the reported UE location information, such as the identification information of the cell to which the UE belongs, cannot accurately represent the current location of the UE, when the existing location reporting process is used for UE positioning.

Figure 21:
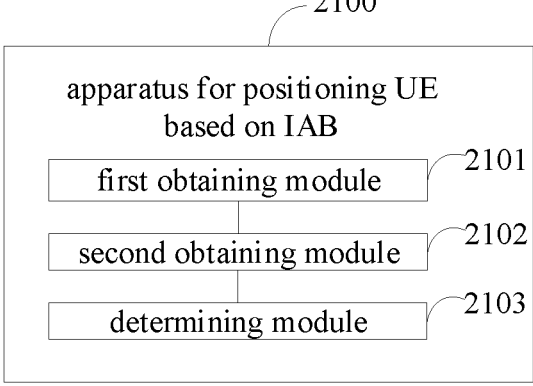
FIG. 21 is a bock diagram of still yet another apparatus for positioning a UE based on IAB according to an embodiment of the present disclosure.

Corresponding to the method for positioning a UE based on IAB provided by the aforementioned embodiments, the present disclosure also provides an apparatus for positioning a UE based on IAB. As the apparatus for positioning a UE based on IAB provided by the embodiments of the present disclosure corresponds to the method for positioning a UE based on IAB provided by the aforementioned embodiments, the implementation of the method for positioning a UE based on IAB is also applicable to the apparatus for positioning a UE based on IAB provided by embodiments of the present disclosure, which will not be described in detail here. FIG. 21 is a block diagram of the apparatus for positioning a UE based on IAB proposed in accordance with the present disclosure.

FIG. 21 is a block diagram of an apparatus for positioning a UE based on IAB provided by an embodiment of the present disclosure. IAB nodes are deployed on movable objects, and this apparatus is applied to an AMF network element.

As shown in FIG. 21, the apparatus 2100 for positioning a UE based on IAB includes a first obtaining module 2101, a second obtaining module 2102 and a determining module 2103.

The first obtaining module 2101 is configured to obtain subscription information of the UE and identification of a movable IAB node corresponding to the UE from a unified data management (UDM) platform in response to a location service request for the UE. The UDM platform stores the correspondence relationship between the UE and the identification of the movable IAB node, as well as the subscription information of the UE, wherein the subscription information indicates whether the UE is a business user of the movable IAB node.

The second obtaining module 2102 is configured to obtain location information of the movable IAB node from a base station based on the identification of the movable IAB node when the subscription information of the UE indicates that the UE is a business user of the movable IAB node.

The determining module 2103 is configured to determine location information of the UE based on the location information of the movable IAB node.

In some embodiments, when the UE registers with the network through a movable IAB node, the correspondence between the UE and the identification of the movable IAB node can be stored on the UDM platform based on the identification of the movable IAB node and the UE.

In some embodiments, when the UE registers with the network through a movable IAB node, the subscription information indicating that the UE is a business user of the movable IAB node is stored on the UDM platform based on the indication information provided by the UE indicating that it is a business user of the movable IAB node.

In some embodiments, the location information of the movable IAB node corresponding to the target UE includes the identification of the base station corresponding to the movable IAB node and the identification of the cell corresponding to the movable IAB node.

In the disclosed embodiment, the identification of the movable IAB node corresponding to the target UE can be obtained from the UDM platform, and the location information of the movable IAB node can be obtained based on the identification of the movable IAB node as the location information of the target UE, thereby avoiding the complex communication process required for tracking the UE located on a movable object and avoiding the power consumption of the UE in this complex communication process, simplifying the UE positioning process and saving the power consumption of the UE.

Figure 22:
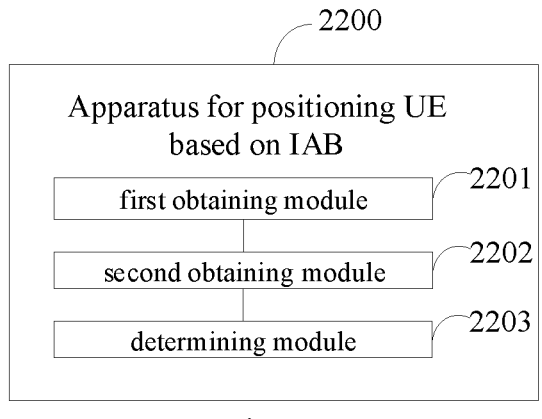
FIG. 22 is a bock diagram of still yet another apparatus for positioning a UE based on IAB according to an embodiment of the present disclosure.

Corresponding to the method for positioning a UE based on IAB provided by the aforementioned embodiments, the present disclosure also provides an apparatus for positioning a UE based on IAB. As the apparatus for positioning a UE based on IAB provided by the embodiments of the present disclosure corresponds to the method for positioning a UE based on IAB provided by the aforementioned embodiments, the implementation of the method for positioning a UE based on IAB is also applicable to the apparatus for positioning a UE based on IAB provided by embodiments of the present disclosure, which will not be described in detail here. FIG. 22 is a block diagram of the apparatus for positioning a UE based on IAB proposed in accordance with the present disclosure.

FIG. 22 is a block diagram of an apparatus for positioning a UE based on IAB provided by an embodiment of the present disclosure. IAB nodes are deployed on movable objects, and this apparatus is applied to GMLC.

As shown in FIG. 22, the apparatus 2200 of positioning a UE based on IAB includes a first obtaining module 2201, a second obtaining module 2202 and a determining module 2203.

The first obtaining module 2201 is configured to obtain subscription information of the UE and identification of a movable IAB node corresponding to the UE from a unified data management (UDM) platform in response to a location service request for the UE, wherein the UDM platform stores the correspondence relationship between the UE and the identification of the movable IAB node and the subscription information of the UE, wherein the subscription information indicates whether the UE is a business user of the movable IAB node.

The second obtaining module 2202 is configured to obtain location information of the movable IAB node from a base station through a location management function (LMF) network element based on the identification of the movable IAB node when the subscription information of the UE indicates that the UE is a business user of the movable IAB node.

The determining module 2203 is configured to determine location information of the UE based on the location information of the movable IAB node.

In some embodiments, when the UE registers with the network through a movable IAB node, the correspondence relationship between the UE and the identification of the movable IAB node can be stored on the UDM platform based on the identification of the movable IAB node and the UE.

In some embodiments, when the UE registers with the network through a mobile IAB node, the subscription information indicating that the UE is a business user of the mobile IAB node is stored on the UDM platform based on the indication information provided by the UE indicating that it is a business user of the mobile IAB node.

In some embodiments, the location information of the movable IAB node corresponding to the target UE includes the identification of the base station corresponding to the movable IAB node and the identification of the cell corresponding to the IAB node.

In the disclosed embodiment, the identification of the movable IAB node corresponding to the target UE can be obtained from the UDM platform, and the location information of the movable IAB node can be obtained based on the identification of the movable IAB node as the location information of the target UE, thereby avoiding the complex communication process required for tracking the UE located on the movable object and avoiding the power consumption of the UE in this complex communication process, simplifying the UE positioning process and saving the power consumption of the UE.

Figure 23:
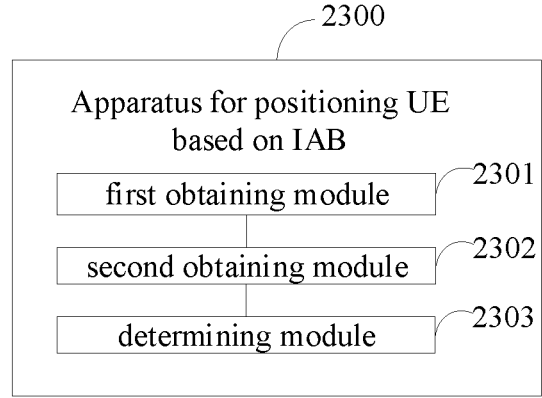
FIG. 23 is a bock diagram of still yet another apparatus for positioning a UE based on IAB according to an embodiment of the present disclosure.

Corresponding to the method for positioning a UE based on IAB provided by the aforementioned embodiments, the present disclosure also provides an apparatus for positioning a UE based on IAB. As the apparatus for positioning a UE based on IAB provided by the embodiments of the present disclosure corresponds to the method for positioning a UE based on IAB provided by the aforementioned embodiments, the implementation of the method for positioning a UE based on IAB is also applicable to the apparatus for positioning a UE based on IAB provided by embodiments of the present disclosure, which will not be described in detail here. FIG. 23 is a block diagram of the apparatus for positioning a UE based on IAB proposed in accordance with the present disclosure.

FIG. 23 is a block diagram of an apparatus for positioning a UE based on IAB provided by an embodiment of the present disclosure. IAB nodes are deployed on movable objects, and this apparatus is applied to a NEF network element.

As shown in FIG. 23, the apparatus 2300 of positioning a UE based on IAB includes a first obtaining module 2301, a second obtaining module 2302 and a determining module 2303.

The first obtaining module 2301 is configured to obtain subscription information of the UE and identification of a movable IAB node corresponding to the UE from a unified data management (UDM) platform in response to a location service request for the UE, wherein the UDM platform stores the correspondence relationship between the UE and the identification of the movable IAB node and the subscription information of the UE, wherein the subscription information indicates whether the UE is a business user of the movable IAB node.

The second obtaining module 2302 is configured to obtain location information of the movable IAB node from a AMF network element or GLMC based on the identification of the movable IAB node when the subscription information of the UE indicates that the UE is a business user of the movable IAB node.

The determining module 2203 is configured to determine location information of the UE based on the location information of the movable IAB node.

In some embodiments, when the UE registers with the network through a movable IAB node, the correspondence relationship between the UE and the identification of the movable IAB node can be stored on the UDM platform based on the identification of the movable IAB node and the UE.

In some embodiments, when the UE registers with the network through a mobile IAB node, the subscription information indicating that the UE is a business user of the mobile IAB node is stored on the UDM platform based on the indication information provided by the UE indicating that it is a business user of the mobile IAB node.

In some embodiments, the location information of the movable IAB node corresponding to the target UE includes the identification of the base station corresponding to the movable IAB node and the identification of the cell corresponding to the IAB node.

In the disclosed embodiment, the identification of the movable IAB node corresponding to the target UE can be obtained from the UDM platform, and the location information of the movable IAB node can be obtained based on the identification of the movable IAB node as the location information of the target UE, thereby avoiding the complex communication process required for tracking the UE located on the movable object and avoiding the power consumption of the UE in this complex communication process, simplifying the UE positioning process and saving the power consumption of the UE.

According to embodiments of the present disclosure, the present disclosure also provides a communication device and a computer readable storage medium.

Figure 24:
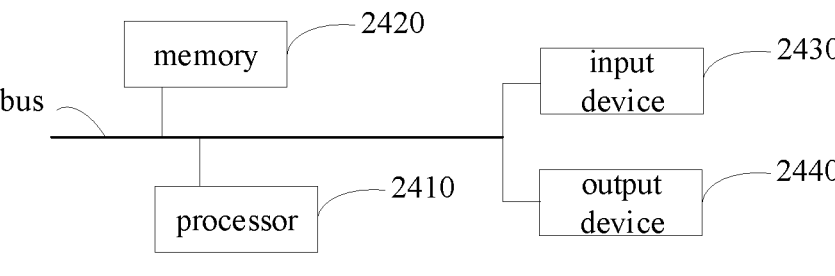
FIG. 24 is a block diagram of a structure of a communication device according to an embodiment of the present disclosure.

FIG. 24 is a block diagram of a communication device according to embodiments of the present disclosure. Communication devices are intended to represent various forms of digital computers, such as laptops, desktops, workstations, personal digital assistants, servers, blade servers, mega computers, and other suitable computers. Communication devices can also represent various forms of mobile devices, such as personal digital processors, cellular phones, smartphones, wearable devices, and other similar computing devices. The components shown in this disclosure, their connections and relationships, and their functions are only examples and are not intended to limit the implementation of the present disclosure described and/or required in this disclosure.

As shown in FIG. 24, the communication device includes one or more processors 2410, a memory 2420, and interfaces for connecting various components, including high-speed interfaces and low-speed interfaces. Respective components are connected to each other using different buses and can be installed on a common motherboard or in other ways as needed. The processor can process instructions executed within the communication device, including instructions stored in the memory or on the memory to display graphical information of the GUI on external input/output devices (such as display devices coupled to interfaces). In other embodiments, if desired, multiple processors and/or multiple buses can be used together with multiple memories. Similarly, multiple communication devices can be connected, each providing some necessary operations (such as serving as a server array, a set of blade servers, or a multiprocessor system). Take a processor 2410 as an example in FIG. 24.

The memory 2420 is a non-transitory computer readable storage medium provided in this disclosure. The memory stores instructions that can be executed by at least one processor to enable the at least one processor to implement the data transmission method provided in the present disclosure. The non-transitory computer readable storage medium of the present disclosure stores computer instructions, which are used to cause a computer to implement the data transmission method provided in the present disclosure.

The memory 2420, as a non-transitory computer readable storage medium, can be used to store non-transitory software programs, non-transitory computer executable programs and modules, such as program instructions/modules corresponding to the data transmission method in the embodiments of the present disclosure. The processor 2010 executes various functional applications and data processing of the server by running non-transitory software programs, instructions, and modules stored in the memory 2420, which implements the data transmission method in the above method embodiments.

The memory 2420 can include a program storage area and a data storage area, wherein the program storage area can store the operating system and the application program required by at least one function. The data storage area can store data created based on the use of positioning the communication device, etc. In addition, the memory 2420 can include a high-speed random access memory and a non-transitory memory, such as at least one disk storage device, flash memory device, or other non-transitory solid-state storage device. Optionally, the memory 2420 may include a memory remotely set relative to the processor 2410, which can be connected to positioning communication devices through a network. Examples of the above networks include, but are not limited to, the internet, enterprise intranets, local area networks, mobile communication networks, and their combinations.

The communication device may also include: an input device 2430 and an output device 2440. The processor 2410, memory 2420, input device 2430, and output device 2440 can be connected through a bus or other means, as shown in FIG. 24 for example.

The input device 2430 can receive the input digital or character information, and generate key signal input related to the user setting and function control of the positioning communication device, such as the touch screen, keypad, mouse, trackpad, touchpad, indicator bar, one or more mouse button, trackball, joystick and other input devices. The output device 2040 can include display devices, auxiliary lighting devices (such as LEDs), and tactile feedback devices (such as vibration motors). The display device can include, but is not limited to, liquid crystal displays (LCDs), light emitting diode (LED) displays, and plasma displays. In some embodiments, the display device may be a touch screen.

Various implementations of the systems and technologies described here can be implemented in digital electronic circuit systems, integrated circuit systems, ASICs (Application Specific Integrated Circuits), computer hardware, firmware, software, and/or combinations of them. These various implementation methods can include: implementation in one or more computer programs, which can be executed and/or interpreted on a programmable system including at least one programmable processor, which can be a dedicated or general-purpose programmable processor that can receive data and instructions from a storage system, at least one input device, and at least one output device, and transmit data and instructions to the storage system, at least one input device, and at least one output device.

These computing programs (also known as programs, software, software applications, or codes) include machine instructions for programmable processors and can be implemented using advanced procedures and/or object-oriented programming languages, and/or assembly/machine languages. As used in this disclosure, the terms "machine readable medium" and "computer readable medium" refer to any computer program product, device, and/or apparatus (such as a disk, optical disk, memory, programmable logic device (PLD)) used to provide machine instructions and/or data to a programmable processor, including machine readable medium that receives machine instructions as machine readable signals. The term "machine readable signal" refers to any signal used to provide machine instructions and/or data to a programmable processor.

In order to provide interaction with users, the system and technology described herein can be implemented on a computer, which has a display device (such as a CRT (cathode ray tube) or LCD (liquid crystal display) monitor) for displaying information to users; and a keyboard and pointing device (for example, a mouse or a trackball) through which a user can provide input to a computer. Other types of devices can also be used to provide interaction with users. For example, the feedback provided to users can be any form of sensory feedback (such as visual feedback, auditory feedback, or tactile feedback); input from users can be received in any form (including voice input, speech input, or tactile input).

The system and technology described here can be implemented in a computing system that includes backend components (such as serving as a data server), or a computing system that includes middleware components (such as an application server), or a computing system that includes front-end components (such as a user computer with a graphical user interface or web browser through which users can interact with the implementation of the system and technology described here), or in a computing system that includes any combination of such back-end components, middleware components, or front-end components. The components of the system can be interconnected through any form or medium of digital data communication (such as communication networks). Examples of communication networks include local area networks (LANs), wide area networks (WANs), and the Internet.

A computer system can include both a client and a server. The client and server are generally far away from each other and typically interact through communication networks. A client-server relationship is generated by running computer programs on corresponding computers that have client-server relationships with each other.

It should be understood that various forms of processes shown above can be used to reorder, add, or delete steps. For example, the steps recorded in this disclosure can be executed in parallel, sequentially, or in different orders. As long as the expected results of the disclosed technical solution can be achieved, this disclosure does not impose any limitations.

The specific implementation mentioned above does not constitute a limitation on the scope of protection of this disclosure. Technicians in this field should understand that various modifications, combinations, sub combinations, and substitutions can be made based on design requirements and other factors. Any modifications, equivalent substitutions, and improvements made within the spirit and principles of this disclosure shall be included within the scope of protection of this disclosure.

What is claimed is:

1. A method for positioning a user equipment (UE) based on integrated access and backhaul (IAB), performed by an access and mobility management function (AMF) network element, wherein IAB nodes are deployed in fixed locations, the method comprising:
   obtaining report information about the UE from a base station in response to a location service request for the UE, wherein the report information comprises identification of an IAB node corresponding to the UE; and
   determining location information of the UE based on the report information.

2. The method of claim 1, wherein determining the location information of the UE based on the report information comprises:
   determining a coverage range of the IAB node based on a preset configuration list and the identification of the IAB node included in the report information, wherein the preset configuration list comprises a correspondence relationship between the identification of the IAB node and the coverage range of the IAB node; and
   determining the location information of the UE based on the coverage range of the IAB node.

3. The method of claim 1, wherein the report information further comprises one or more of: identification of the base station corresponding to the UE and identification of a service cell corresponding to the UE.

4. The method of claim 3, wherein determining the location information of the UE based on the report information comprises:
   transmitting the report information to a network exposure function (NEF) network element, for the NEF network element to determine the location information of the UE based on at least one of the identification of the IAB node, the identification of the base station corresponding to the UE, or the identification of the service cell corresponding to the UE included in the report information.

5. A communication device, comprising a transceiver; a memory; and a processor, connected to the transceiver and the memory respectively, and configured to control wireless signal transmitting and receiving of the transceiver by executing computer executable instructions on the memory, and capable of implementing the method according to claim 1.

6. A method for positioning a user equipment (UE) based on integrated access and backhaul (IAB), performed by a base station, wherein IAB nodes are deployed in fixed locations, the method comprising:
   obtaining report information in response to a location information report request for the UE, wherein the report information comprises identification of an IAB node corresponding to the UE; and
   transmitting the report information to an access and mobility management function (AMF) network element, for the AMF network element or a NEF network element to determine location information of the UE according to the report information.

7. The method of claim 6, wherein transmitting the report information to the AMF network element comprises:
   determining whether the IAB node corresponding to the UE is an authorized IAB node; and
   if the IAB node corresponding to the UE is an authorized IAB node, transmitting the report information including the identification of the IAB node to the AMF network element.

8. The method of claim 6, wherein obtaining the report information comprises:
   obtaining the report information through a F1 interface between the base station and the IAB node, or based on local configuration information of the base station, wherein the local configuration information of the base station indicates a correspondence relationship between the IAB node and the F1 interface.

9. The method of claim 6, wherein obtaining the report information comprises:

obtaining the report information through NR Uu links between multiple IAB nodes.

10. The method of claim 6, wherein the report information further comprises one or more of: identification of a base station corresponding to the UE and identification of a service cell corresponding to the UE.

11. A communication device, comprising:

a processor; and a memory, configured to store instructions executable by the processor, wherein the processor is configured to implement the method of claim 6 when running the instructions stored in the memory.

12. A method for positioning a user equipment (UE) based on integrated access and backhaul IAB, performed by a gateway mobile location center (GMLC), wherein IAB nodes are deployed on movable objects, and the method comprises:

obtaining subscription information of the UE and identification of a movable IAB node corresponding to the UE from a unified data management (UDM) platform in response to a location service request for the UE, wherein the UDM platform stores a correspondence relationship between the UE and the identification of the movable IAB node, and the subscription information of the UE, wherein the subscription information indicates whether the UE is a business user of a movable IAB node;

obtaining location information of the movable IAB node through a location management function (LMF) network element based on the identification of the movable IAB node, if the subscription information of the UE indicates that the UE is a business user of a movable IAB node; and determining location information of the UE based on the location information of the movable IAB node.

13. The method of claim 12, further comprising:

when the UE registers with a network through a movable IAB node, storing the correspondence relationship between the UE and the identification of the movable IAB node on the UDM platform based on the identification of the movable IAB node and the UE.

14. The method of claim 13, further comprising:

when the UE registers with the network through the movable IAB node, storing the subscription information indicating that the UE is a business user of the movable IAB node on the UDM platform based on the indication information provided by the UE indicating that the UE is the business user of the movable IAB node.

15. The method of claim 12, wherein the location information of the IAB node comprises geographic location information of the IAB node in a graphical form.

16. A communication device, comprising:

a processor; and a memory, configured to store instructions executable by the processor, wherein the processor is configured to implement the method of claim 12 when running the instructions stored in the memory.

\*   \*   \*   \*   \*